US009258321B2

(12) United States Patent
Amsler et al.

(10) Patent No.: US 9,258,321 B2
(45) Date of Patent: Feb. 9, 2016

(54) AUTOMATED INTERNET THREAT DETECTION AND MITIGATION SYSTEM AND ASSOCIATED METHODS

(71) Applicant: Raytheon Foreground Security, Inc., Heathrow, FL (US)

(72) Inventors: David B. Amsler, Heathrow, FL (US); Nick Allen, Herndon, VA (US); Sarah Messer, Silver Spring, MD (US); Trent Healy, Fairfax, VA (US)

(73) Assignee: Raytheon Foreground Security, Inc., Heathrow, FL (US)

( * ) Notice: Subject to any disclaimer, the term of this patent is extended or adjusted under 35 U.S.C. 154(b) by 0 days.

(21) Appl. No.: 13/973,027

(22) Filed: Aug. 22, 2013

(65) Prior Publication Data

US 2014/0201836 A1   Jul. 17, 2014

Related U.S. Application Data

(60) Provisional application No. 61/692,481, filed on Aug. 23, 2012, provisional application No. 61/771,990, filed on Mar. 4, 2013.

(51) Int. Cl.
*H04L 29/06* (2006.01)

(52) U.S. Cl.
CPC ............ *H04L 63/1425* (2013.01); *H04L 63/20* (2013.01)

(58) Field of Classification Search
CPC ........................... H04L 63/1425; H04L 63/20
USPC ......................................................... 726/23
See application file for complete search history.

(56) References Cited

U.S. PATENT DOCUMENTS 5,991,881 A   11/1999   Conklin et al.
6,301,668 B1   10/2001   Gleichauf et al.
(Continued)

FOREIGN PATENT DOCUMENTS

CA   2747584 A   11/2012
EP   1090492 B1   8/2005
(Continued)

OTHER PUBLICATIONS

"Automated Vulnerabiltiy Assessment That Streamlines Risk Assessment and Action"; McAfee Solution Brief; 2009.
(Continued)

*Primary Examiner* — Michael S McNally
(74) *Attorney, Agent, or Firm* — Schwegman Lundberg & Woessner, P.A.

(57) ABSTRACT

A risk assessment and managed security system for network users provides security services for dealing with formidable cyber threats, malware creations and phishing techniques. Automated solutions in combination with human-driven solutions establish an always-alert positioning for incident anticipation, mitigation, discovery and response. A proactive, intelligence-driven and customized approach is taken to protect network users. Assessments of threats are made before and after a breach. Cyber threats are identified in advance of a resulting network problem, and automated analysis locates the threats and stops them from having an adverse effect. Humans can focus on the high-level view, instead of looking at every single potential problem area. Troubling patterns may be reviewed within the network environment to identify issues. Cyber analysis is conducted to provide a baseline over time via statistically proven, predictive models that anticipate vulnerabilities brought on by social-media usage, Web surfing and other behaviors that invite risk.

16 Claims, 22 Drawing Sheets

(56) References Cited

U.S. PATENT DOCUMENTS

| | | |
|---|---|---|
| 6,324,647 B1 | 11/2001 | Bowman-Amuah |
| 7,373,666 B2 | 5/2008 | Kaler et al. |
| 7,415,728 B2 | 8/2008 | Morohashi et al. |
| 7,418,733 B2 | 8/2008 | Connary et al. |
| 7,451,489 B2 | 11/2008 | Cantrell et al. |
| 7,454,499 B2 | 11/2008 | Cantrell et al. |
| 7,454,792 B2 | 11/2008 | Cantrell et al. |
| 7,463,590 B2 | 12/2008 | Mualem et al. |
| 7,574,740 B1 | 8/2009 | Kennis |
| 7,594,270 B2 | 9/2009 | Church et al. |
| 7,707,637 B2 | 4/2010 | Kaler et al. |
| 7,893,830 B2 | 2/2011 | Anand et al. |
| 7,895,641 B2 | 2/2011 | Schneier et al. |
| 7,930,256 B2 | 4/2011 | Gonsalves et al. |
| 8,046,835 B2 | 10/2011 | Herz |
| 8,079,080 B2 | 12/2011 | Borders |
| 8,171,554 B2 | 5/2012 | Elovici et al. |
| 8,180,886 B2 | 5/2012 | Overcash et al. |
| 8,255,996 B2 | 8/2012 | Elrod et al. |
| 8,296,842 B2 | 10/2012 | Singh et al. |
| 8,370,940 B2 | 2/2013 | Holloway et al. |
| 8,402,540 B2 | 3/2013 | Kapoor et al. |
| 8,407,335 B1 | 3/2013 | Church et al. |
| 8,407,791 B2 | 3/2013 | Granstedt et al. |
| 8,418,249 B1 | 4/2013 | Nucci et al. |
| 8,424,091 B1 | 4/2013 | Su et al. |
| 8,640,234 B1 | 1/2014 | Gassen et al. |
| 8,739,287 B1 | 5/2014 | Polyakov et al. |
| 2002/0078381 A1 | 6/2002 | Farley et al. |
| 2002/0087882 A1 | 7/2002 | Schneier et al. |
| 2003/0172145 A1 | 9/2003 | Nguyen |
| 2004/0260947 A1 | 12/2004 | Brady et al. |
| 2006/0064740 A1 | 3/2006 | Kelley et al. |
| 2006/0212932 A1 | 9/2006 | Patrick et al. |
| 2007/0076853 A1* | 4/2007 | Kurapati et al. ............ 379/1.01 |
| 2008/0016569 A1 | 1/2008 | Hammer et al. |
| 2008/0098476 A1 | 4/2008 | Syversen |
| 2008/0184371 A1 | 7/2008 | Moskovitch et al. |
| 2008/0307525 A1 | 12/2008 | Nickle |
| 2009/0007145 A1 | 1/2009 | White et al. |
| 2009/0070880 A1 | 3/2009 | Harris et al. |
| 2010/0017870 A1 | 1/2010 | Kargupta |
| 2010/0064039 A9 | 3/2010 | Ginter et al. |
| 2010/0082513 A1* | 4/2010 | Liu ................................ 706/46 |
| 2010/0235915 A1 | 9/2010 | Memon et al. |
| 2010/0251369 A1 | 9/2010 | Grant |
| 2010/0325731 A1 | 12/2010 | Evrard |
| 2011/0010633 A1 | 1/2011 | Richmond et al. |
| 2011/0019574 A1* | 1/2011 | Malomsoky et al. ......... 370/252 |
| 2011/0023115 A1 | 1/2011 | Wright |
| 2011/0023118 A1 | 1/2011 | Wright |
| 2011/0131163 A1 | 6/2011 | Stern et al. |
| 2011/0138471 A1 | 6/2011 | Van De et al. |
| 2011/0184877 A1 | 7/2011 | Mchugh et al. |
| 2011/0219445 A1* | 9/2011 | Van Der Merwe et al. ..... 726/22 |
| 2011/0239303 A1 | 9/2011 | Owens |
| 2011/0282997 A1 | 11/2011 | Prince et al. |
| 2011/0283359 A1 | 11/2011 | Prince et al. |
| 2012/0022942 A1 | 1/2012 | Holloway et al. |
| 2012/0023090 A1 | 1/2012 | Holloway et al. |
| 2012/0023572 A1 | 1/2012 | Williams, Jr. et al. |
| 2012/0069978 A1 | 3/2012 | Evans et al. |
| 2012/0096558 A1 | 4/2012 | Evrard |
| 2012/0102570 A1 | 4/2012 | Herz |
| 2012/0116896 A1 | 5/2012 | Holloway et al. |
| 2012/0117222 A1 | 5/2012 | Holloway et al. |
| 2012/0117239 A1 | 5/2012 | Holloway et al. |
| 2012/0117267 A1 | 5/2012 | Holloway et al. |
| 2012/0117458 A1 | 5/2012 | Holloway et al. |
| 2012/0117649 A1 | 5/2012 | Holloway et al. |
| 2012/0246727 A1 | 9/2012 | Elovici et al. |
| 2012/0260337 A1* | 10/2012 | Van der Merwe .............. 726/22 |
| 2012/0323558 A1 | 12/2012 | Nolan et al. |
| 2013/0055394 A1 | 2/2013 | Beresnevichiene et al. |
| 2013/0055399 A1 | 2/2013 | Zaitsev |
| 2013/0117848 A1 | 5/2013 | Golshan et al. |
| 2013/0254838 A1 | 9/2013 | Ahuja et al. |
| 2013/0312101 A1* | 11/2013 | Lotem et al. .................... 726/25 |
| 2014/0007238 A1* | 1/2014 | Magee et al. ................... 726/24 |
| 2014/0047546 A1 | 2/2014 | Sidagni |
| 2014/0137257 A1* | 5/2014 | Martinez et al. ................ 726/25 |
| 2015/0058985 A1 | 2/2015 | Sanchez et al. |
| 2015/0096024 A1 | 4/2015 | Haq et al. |

FOREIGN PATENT DOCUMENTS

| | | |
|---|---|---|
| EP | 2882159 A1 | 6/2015 |
| KR | 20080079767 A | 9/2008 |
| KR | 20090090641 A | 8/2009 |
| WO | 2004111785 A2 | 12/2004 |
| WO | 2010071625 A | 6/2010 |
| WO | 2012034304 A | 3/2012 |

OTHER PUBLICATIONS

Brugger; "Data Mining Methods for Network Intrusion Detection"; Univ. of CA; 2004.

David; Using Operational Risk Management (ORM) to Improve Computer Network Defense (CND) Performance in the Department of the Navy (DON); (DON)Postgrad School Thesis; Mar. 2001.

Dornseif et al.; "Vulnerability Assessment Using Honeypots"; KG Sauer Verlag, Muchen; 2004.

Fragkos; "Near Real-Time Threat Assessment using Intrusion Detection Systems's Data"; PhD Thesis; Glamorgan Univ., Wales; 2010.

Haslum; "Real-Time Network Intrusion Prevention"; Doctoral Thesis; NTNU; 2010.

Holsopple et al.; "TANDI; Threat Assessment of Network Data and Information"; Rochester Institute of Technology.

Lathrop et al.; "Modeling Network Attacks"; West Point Academy, NY.

Maybury et al.; "Analysis and Detection of Malicious Insiders"; International Conference on Intell. Analysis; 2005.

Mell; "Understanding Intrusion Detection Systems"; EDPACS, vol. XXIX, No. 5; 2001.

Quinlan; "Network Threat Discover Detection and Analysis on the Wire"; Norman Whitepaper, 2012.

Weihua et al.; "An Integrated Solution for Network Threat Detection and Automatic Reaction"; China Communications, 2006.

* cited by examiner

AUTOMATED INTERNET THREAT DETECTION AND MITIGATION SYSTEM AND ASSOCIATED METHODS

CROSS-REFERENCE TO RELATED APPLICATIONS

This application claims the benefit of U.S. Provisional Application Ser. No. 61/692,481 for System and Method for Securing Network Information Systems having filing date Aug. 23, 2012 and U.S. Provisional Application Ser. No. 61/771,990 for Automated Internet Threat Detection and Mitigation System and Associated Methods having filing date Mar. 4, 2013, the disclosures of which are hereby incorporated by reference in their entirety and all commonly owned.

FIELD OF THE INVENTION

The present invention generally relates to network security and in particular to an automated system and method for detecting, evaluating and reporting network threats

BACKGROUND

As is well known in the art, Internet users and organizations must keep up with today's increasingly formidable cyber threats, as a dizzying array of malware creations and phishing techniques continue to grow in sophistication and sheer numbers. There is a need for a combination of automated and human-driven solutions to establish always-alert positioning for incident anticipation, mitigation, discovery and response. While nearly all Managed Security Service Providers (MSSPs) look only for red lights and then simply pass this information along to customers, it is desirable to have systems and methods that take a proactive, intelligence-driven and customized approach to protect network users from even the most intricately conceived threats.

SUMMARY

Embodiments of the present invention provide risk assessment and managed security systems and methods for network users, such as commercial organizations by way of example, and provide managed security services knowing that organizations must deal with formidable cyber threats, malware creations and phishing techniques. Embodiments of the invention provide automated solutions and a combination of automated and human-driven solutions to establish an always-alert positioning for incident anticipation, mitigation, discovery proactive and response. Embodiments of the invention include systems and methods that take a, intelligence-driven and customized approach to protect network users from even the most intricately conceived threats.

The teachings of the present invention go beyond infrastructure monitoring and event notification as is typical in the art. It is realized that there are endless varieties of exploiting methods, malware manifestations and anonymization strategies that routinely evade well-known controls. Networks are best served by assessments of events before and after a breach from outside experts, as people within organizations are typically busy enough with their other IT related responsibilities. Embodiments of the present invention identify threats in advance of a resulting network problem, by way of example, and then automate analysis of all data to find those threats and stop them from having an adverse effect. Automated systems and methods blanket the enterprise landscape so humans can focus on the high-level view, instead of looking at every single potential problem area. Once guided by the automated system and methods of the present invention, a person may review troubling patterns within the relative network environment to identify issues. Such functionality is combined with insights from users, the Intelligence Community (IC) and industry/open source resources. Cyber analysis is conducted to provide a baseline over time via statistically proven, predictive models that anticipate vulnerabilities brought on by social-media usage, Web surfing and other behaviors that invite risk.

One embodiment of the invention may be a computer-implemented system for automated internet threat detection and mitigation, wherein the system may comprise a centralized database and a customer database operable with the centralized database. A threat Intelligence subsystem may receive intelligence data from a plurality of external intelligence sources and an analytics subsystem communicates with the threat intelligence subsystem for tracking accuracy and relevance of the intelligence data, wherein suspicious patterns are transmitted to the centralized database for use by automatic query security tools in a customer network environment. The system may further comprise a data gathering subsystem for gathering public data from a plurality of website sources sufficient for providing context for the analytics subsystem, and a portal subsystem comprising at least one of an analyst portal and a customer portal The analyst portal allows analysts to query the customer database and incidents detected resulting from patterns from the threat intelligence segment. The analyst portal tracks various metrics of analyst performance and provides feedback to the system. The customer portal may allow the customer to view the analyst performance metrics as well as customize threat intelligence feeds, local security tools, and descriptions of the customer environment and customer assets, and wherein the customer portal provides information feedback for the system.

The threat Intelligence subsystem may comprise a reader processor for ingesting the intelligence data from the plurality of external intelligence sources, wherein the reader processor may processes the data received from each source for providing normalized data in a preselected standard format.

A filter processor may be operable with the centralized database and the customer database for comparing the threat intelligence data associated with customer enterprise security devices. Yet further, an investigator processor may providing fill-in data associated with suspicious events received from the filter processor, wherein detailed incidents are passed from investigator processor through the filter processor to an incident database stored within at least one of the centralized database and the customer database, and wherein identified suspicious events are passed to the investigator processor from the filter processor for researching additional details.

The computer-implemented system may further comprise a Honeytrap subsystem deployed within the customer network environment, wherein the Honeytrap subsystem monitors scams and cyber-attacks and analyzes suspicious activity, feeding resulting analysis data to the analytics subsystem.

A method aspect of the invention may comprise a computer-implemented method for automated internet threat detection and mitigation, wherein the method may include providing an analytics subsystem for identifying suspicious patterns of behavior in a customer network environment. A reader process may be operable with the analytics subsystem for gathering threat intelligence data from a plurality of threat intelligence sources, including commercial and open-source feeds as well as suspicious patterns identified by the analytic subsystem or specified by an analysts through a portal connection. The data may further be normalized by the reader processor for providing a common format. The method may further provide an initial believability factor based only on past performance of the relevant source of the threat intelligence data. By providing a gatekeeper processor operable with the reader processor and the analytics subsystem, the gatekeeper may review the normalized intelligence data and compare the data to past incidents and rules operable by the analytics subsystem for refining the believability factor and severity of each indicator. By way of example, if the believability factor is too low, the gatekeeper processor may either ask a human to check the data or discard the believability factor indicated as unusable and overly likely to generate false positives.

By way of further example, one method for automatically securing a network against threats may comprise collating data feeds for sending through a scanning system; scanning the data feeds based on preselected categories by determining type of information discerned from each data feed; tagging data from the data feed scanning and providing extended data pieces by adding context surrounding threats including at least one of geophysical, customer verticals, operating system, adversary campaigns, and a combination thereof; storing the tagged data into at least one of a relational database and a NoSQL database, wherein the storing is based on contextual tags and link analysis between contextual categories assigned to the data pieces; automatically scanning multiple different programs based on enterprise tools for taking contextual threat data pieces and projecting the contextual threat data pieces into enterprise tools using application programming interfaces; automatically discovering a match for at least one of the threat data pieces to the tagged data; and sending an alert to a security information and event manager (SIEM).

BRIEF DESCRIPTION OF DRAWINGS

Embodiments of the invention are described by way of example with reference to the accompanying drawings in which.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

Figure 1:
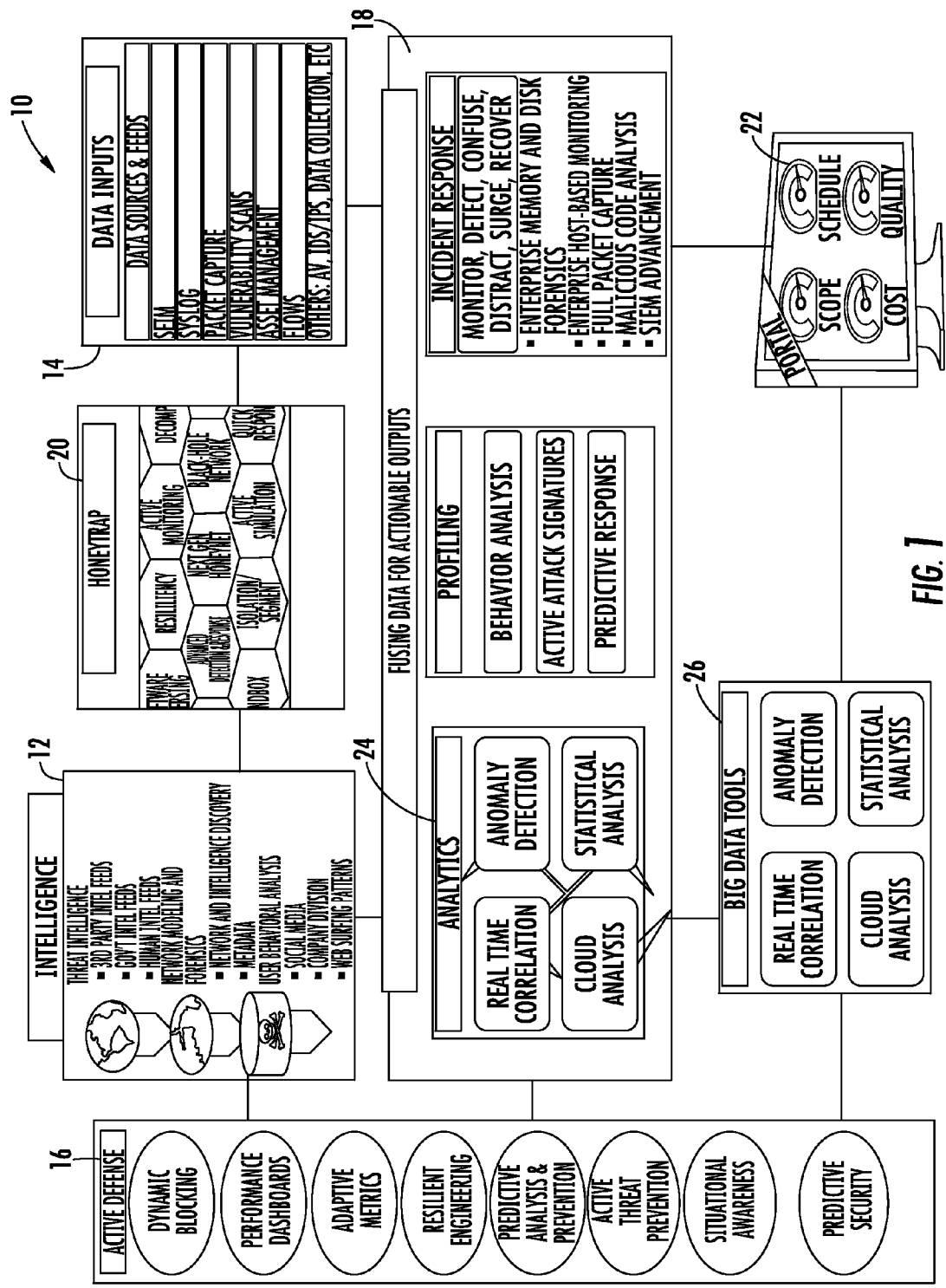
FIG. 1 is a diagrammatical illustration of one network security management system according to the teachings of the present invention.

With reference initially to FIG. 1, one network security management system 10 is illustrated, by way of example, according to the teachings of the present invention. Threat Intelligence Optimization (TIO) 12 includes receiving multiple and different sources of intelligence and/or data from data input 14, deriving contextual inferences for those pieces of data, and tagging the information appropriately to then disseminate into enterprise security solutions as an active defense 16 that a network owner or user is relying upon for services. As will be detailed later in this disclosure, automation occurs at different stages. "Cyveillance" is performed and data normalized 18 and delivered to a threat intelligence database. Information is also pulled from customer environment such as with baselining, statistics, modeling, predictive models, Next Gen Honeynet, MetaData, profiling, Incident Response, and the like. By automating the analysis from the created database, there is no need for typical Tier 1 analysts.

With continued reference to FIG. 1, an improved Honeynet, herein referred to as a HoneyTrap 20 is provided and inlcudes an active VLAN within a customer or owner network. As will be further detailed later, the HoneyTrap mimics or copies critical and common systems within the customer environment. There is active monitoring on network ports, portal 22, and end point systems using forensic tool sets. Once an APT or Insider (or Intruder) tries to move laterally within an environment, the Intruder is identified instantly and an IOC created. When the HoneyTrap 20 becomes infected, Forensic and IR tool sets instantly alert and create the IOC. Not only are Tier 4 analysts alerted via the portal 22 from the threat intelligence optimization 12, but different scenario based approaches for a customer are also made available to lower response time to incidents, and also help mitigate or manage incidents better. The data normalization and fusion 18 take place with data analytics 24 bringing the process together. The threat intelligence DB automates analysis of all the normalized data. Analysts may investigate anything that appears. As illustrated with continued reference to FIG. 1, a Big Data Analytics platform 26 baselines the network environment, detects anomalies or statistical detection and then alerts an analyst. When something is detected, IR&F tools are utilized to investigate further along with Honeynet/Malware environment. The Active Defenses 16 are developed to respond and eradicate the intruder. Threat intelligence is updated. Once data is normalized/fused, it can be sent into the Big Data Analytics platform 26 where machine learning code can perform specific automated analysis, as will be further detailed below.

Threat intelligence reading, combining and using "Threat Intel" from many sources will ensure that a network system is protected against omitting important patterns. Rating the believability of each source with Analyst Feedback, and comparing new threat intelligence to historical incidents helps protect clients/users from wasting Analyst time on false positives. The threat intelligence also provides an ongoing check of the effectiveness of the analytics system. This data provides context for Honeytrap and data gathering operations.

Figure 2:
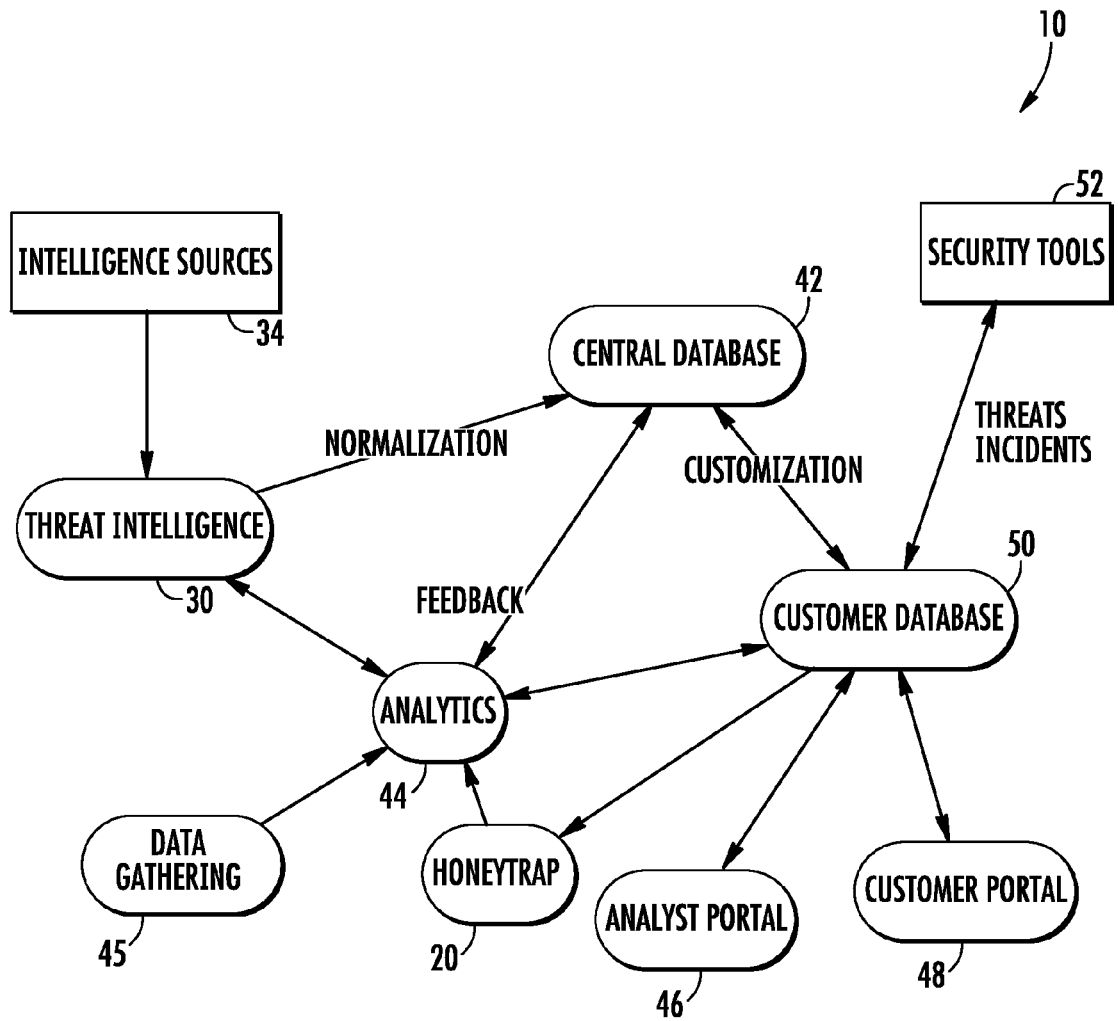
FIG. 2 is a block diagram illustrating components of one automated threat detection and mitigation system according to the teachings of the present invention.
Figure 3:
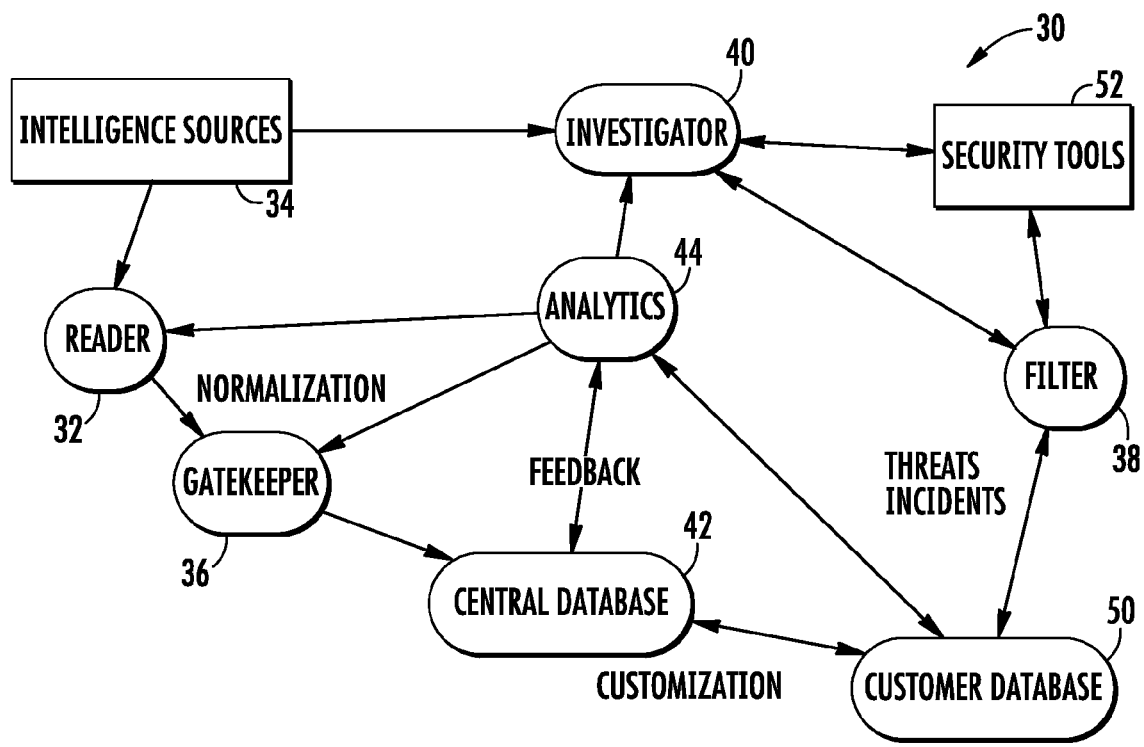
FIG. 3 is a block diagram illustrating components of a Threat Intelligence subsystem and relationship to other subsystems within the system if FIG. 1.

Reference is now made to FIGS. 2 and 3 for one embodiment of the system 10 directed to automated threat detection and mitigation, wherein a threat intelligence subsystem includes a Reader 32 which assigns each pattern a severity value based on descriptors available from several intelligence sources 34. A Gatekeeper 36 assigns a believability based on past performance of patterns from each of the intelligence sources 34. A Filter 38 uses the threat intelligence to query each customer's Security Tools, and an Investigator 40 does initial, automated follow-up analysis to provide a detailed picture of each identified incident, adjusting severity & believability based on what it finds. This investigation includes gathering of raw patent capture (PCAP) and log information, both before and after a detected incident. Incidents with high believability and severity are given priority. As human analysts fill out incident reports, the system 10 incorporates their findings to improve its estimates of believability and severity. This allows the system to automatically adjust to emphasize the most-important threats. This feedback process happens both for individual customers and for the system as a whole.

In one embodiment, the Reader 32 and Gatekeeper 36 are installed at a central location, such as at a Foreground™ facility, by way of example. This will minimize the number of requests for information, which will be used by multiple customers. For one embodiment, the Reader 32 uses a modular design so that new intelligence sources can be easily added.

It is sometimes possible for attackers to monitor reputation databases and external network traffic to determine when they have been detected. To minimize the chances of this, software of the Investigator 40 anonymizes queries to the external Intelligence Sources 34. The Filter 38 and the Investigator 40 are installed separately for each client/user and are may be modular to allow easy customization to each client's particular set of Security Tools.

A Manager subsystem handles coordination between each client's installation and a central database 42. This allows client installations to learn from each other based on patterns observed across all Foreground™ customers, by way of example, or within specific industries.

Analytics

With continued reference to FIGS. 2 and 3, Analytics 44 (analytics software package, by way of example) uses a wide variety of tools to diagnose threats and suspicious activity. Although some individual tools may be well known, they are rarely used in a security environment. By way of example, a toolset, referred to in FIG. 1 as Big Data Analytics Platform 26, may include statistical analysis, link analysis, and machine-learning tools. These allow a leveraging of a variety of netflow and customer-specific data to provide individualized, continuously updated profiles of each customer's network, including suspicious activity. Using a variety of analytic tools will help protect the system from unexpected attack vectors and attackers who use knowledge of the system to target clients. The use of the two-axis analog ratings Severity and Believability for event & incident analysis will help analysts quickly and easily distinguish between situations that are truly dangerous, those that are suspicious, and those that are low-priority problems. Feedback from the Analysts 44 will automatically be incorporated to improve the analytics across all customers.

By way of example, challenges to be confronted through analytics may be divided into two categories: Descriptive and Predictive.

Descriptive challenges focus on rapidly obtaining a large amount of detailed information. This information may be used either to do link analysis of an incident or to develop baseline models of normal behavior for particular users, assets, customers, and external machines. These descriptions can then be presented to analysts to speed their investigations, or used to develop Predictive tools.

Predictive tools use machine-learning tools to prioritize threat intelligence, to predict when and how attacks may occur, and to refine the Descriptive tools so they discover and present the information most likely to be useful to an analyst.

Feedback between the Predictive and Descriptive tools and with the human analysts improves the operation of all three.

Automated Incident Analysis

The Descriptive tools being implemented provide detailed information about each incident to the human analysts. When an analyst views a newly detected incident, it will already include reputation and baseline information about each of the involved computers, both internal and external. It can also show the amount of traffic to and from internal machines and suggest other incidents, which may be related. When analysts file their reports, the system will use their determinations of whether the event was a false positive, what its severity was, and which factors were important to improve the automated analysis for future incidents.

The Analytics 44 component of this task handles the computation and databases necessary for this adaptation. The Investigator 40 portion of the Threat Intelligence subsystem 30 handles the data requests and assembly of the gathered information for each individual incident.

Base-Lining

By way of example, the behavior of each client is recorded and monitored for the client's internal machines and the external machines, to which the system 10 communicates. This allows normal patterns of use to be found, including times of activity, sizes of files transferred, and web sites visited. This information provides useful context for incident analysis. Outliers can also be used to detect suspicious events. Implementing baselining on a broad basis will allow us to automatically build classifications of users, companies, assets, and external sites. Clusters of machines that often communicate with each other may be expected to spread malware rapidly between them. Machines that are observed to communicate in large volumes with many other machines will be primary targets for attackers. Machines, which frequently have external contact with a wide variety of sites, may be especially frequent infection points. External sites, which are often associated with detected incidents, may become candidates for blacklisting or new threat intelligence signatures. Internal machines associated most frequently with infections may signal a need for user training or improved protection.

Predictive Tools

The baselining described above is one aspect of predicting when, where, and how attacks will occur. These predictions can be used to check the accuracy and relevance of descriptive models and to request increased numbers of analysts or analysts with particular skills. They can also be used to predict which data an analyst will find most useful. The predictive tools use a variety of machine-learning algorithms and feedback from the analyst reports.

Predictive tools will draw additional inputs from broadly available data sets that are not specific to cyber security. These may include financial and political data for each client and its rivals. Such information may be useful to incident response in establishing likely actors and motives.

Customer Specific Adaptation

Some pieces of Threat Intelligence are tagged for specific industries, and will be given higher priorities for customers within those industries. Some portions of the analytics subsystem 44 will be installed separately at each client site. This will allow detection of customer-specific and industry-specific patterns, even for threat intelligence which is not already tagged with that information. Feedback for that customer's incidents and baselining of that customer's assets will help to optimize the Threat Intelligence and Incident Analysis for that customer's needs.

By way of example, one embodiment of the invention includes a computer-implemented method for automatically securing a network against threats, wherein the method comprises collating data feeds for sending through a scanning system, scanning the data feeds based on preselected categories by determining type of information discerned from each data feed, and tagging data from the data feed scanning. Extended data pieces are provided by adding context surrounding threats including at least one of geophysical, customer verticals, operating system, adversary campaigns. In addition, one or a combination of the following steps may include: storing the tagged data into at least one of a relational database and a NoSQL database, wherein the storing is based on contextual tags and link analysis between contextual categories assigned to the data pieces; automatically scanning multiple different programs based on enterprise tools for taking contextual threat data pieces and projecting the contextual threat data pieces into enterprise tools using application programming interfaces; automatically discovering a match for at least one of the threat data pieces to the tagged data; and sending an alert to a security information and event manager (SIEM).

System-wide Adaptation

Similarities between different customers and their incidents can be used to identify patterns across an entire customer base, by way of example. These patterns and trends may be too subtle or statistically insignificant for each customer to recognize individually. They may also relate to broadly applicable financial or political indicators or to opportunistic attackers. Commonalities between many customers' experiences can be used to refine the behavior of the Reader 32, the Gatekeeper 36, and the Manager portions of the Threat Intelligence subsystem 30, above described with reference to FIGS. 2 and 3. It will also be used to guide the adaptation of local installations of the Investigator 40, to indicate training needs for analysts in general, and to inform Foreground decisions about further development and resource allocation.

Learning Algorithms

Much of the adaptation will be done through machine-learning tools. There are many possible tools, each of which has a variety of parameters, which can be used to adjust its operation. Much of the challenge in developing a machine-learning system is to choose an appropriate tool and to fine-tune its parameters to give optimum performance. Many such tools may be run in parallel to better compare their operations. The majority of these tools will be "Pupils" which are used and modified on a trial basis. New Pupils can be added and underperforming ones can be discarded.

Each question that is given over to the machine-learning components will have a single "Teacher" associated with it. This Teacher is itself a machine-learning tool, which is responsible for generating, grading, and modifying the various trial machine-learning tools. The Teacher tracks the performance of each of its assigned Pupils, learning which ones produce the best and fastest answers. The Teacher will also be able to create new Pupils and to discard those, which consistently perform poorly. This automation will speed the development of machine-learning algorithms to answer new questions.

Portals

With continued referee to FIG. 2, an Analyst Portal 46 allows Analysts to review events of interest prioritized by estimated severity and believability, and shows them which events/their coworkers have already claimed incidents. It also allows them to group multiple auto-detected events together and to treat them as a single incident. The analysts' assessment of incident severity and False Positives will be fed back into the Threat Intel database. A Client Portal 48 allows a customer to quickly see which incidents their analysts are currently handling, as well as histories of incidents. It may show which individual analysts are prioritizing high-severity incidents, which are handling the most incidents, and trends in the analysts' incident reports. It may also be used to recommend staffing levels (based on the Analytics package 44).

Honeytrap

With continued reference to FIG. 2, and as initially introduced with reference to FIG. 1, the Honeytrap 20, according to the teachings of the present invention, outperforms traditional honeypots by allowing analysts to shunt suspected processes and attackers onto a separate virtual LAN, by way of example. This and a set of passive and active live forensic tools provide additional data for the system.

By way of further example regarding the Honeytrap 20, one embodiment comprises a Honeytrap server forming a virtual local area network (VLAN) on a user network that looks like an actual part of the network and set up to attract an "intruder" as an actual function of the network. The Honeytrap 20 provides a one-way entry to a copy of the main server in terms of the domain so that it looks like the actual user network. As a result, lateral hacking can be detected and once a hacker or intruder enters the user network. The intruder is encouraged to go laterally and enter into to the Honeytrap server. Once inside the Honeytrap 20, the intruder can't leave and is trapped. This essentially keeps the intruder alive instead of shutting it down. By way of example, typical Honeynet methods immediately shut down and lock out a threat and thereby re-image a computer, and thus lose the intelligence. As above described, the Honeytrap 20 of the present invention mimics the environment of the user network and keeps the threat alive so it can be learned how such a malware intruder works, learn about it and then teaches the rest of the system to look for that particular malware intruder. Thus, once the intruder is identified, an indicator(s) of compromise (IOC) is created for the intruder, the intruder is trapped in the Honeynet, and information is populated to the appropriate users or to a general database.

Generally, a Honeynet is well known in the art and is typically a separate network set up with intentional vulnerabilities. Its purpose is to invite attack, so that attacker activities and methods can be studied and resulting information used to increase network security. Typically, a Honeynet contains one or more "honey pots" including computer systems on the Internet expressly set up to attract and "trap" intruders who attempt to penetrate computer systems where they are not welcome. Although the primary purpose of a Honeynet is to gather information about methods and motives of the attacker, the decoy network can benefit its operator by diverting attackers from a real network and its resources. There is a HoneyNet Project, a non-profit research organization dedicated to computer security and information sharing.

More specifically with regard to the Honeytrap 20 according to the teachings of the present invention, the Honeytrap 20 mimics or copies critical and common systems within the customer environment (e.g. DC, DNS, Database(s), Web, Desktop, File, etc.). There is active monitoring on the network, ports, and end point systems using forensic tool sets (Foreground IP™ and Open Source™, possibly commercial systems such as NetWitness™). Once an APT or Insider (or Intruder) tries to move laterally within an environment, the Intruder is identified instantly and an IOC created. The IOCs are plugged into the threat intelligence database (DB) 42 and thus it is known where else in the environment the intruder may be moving or attempting penetration. When, the Honeynet system becomes infected, Forensic and IR tool sets instantly alert and create the IOCs. Once again that is plugged into the data fusion and it is known where else this has happened, how it is happening, and how they are communicating. The environment is "black-holed" so there is no external communication, but Malware Analysis is performed and it is learned how the Intruder acts, looks, feels and thus improved active defenses can be created to eradicate the Intruder form the rest of the network environment. This then feeds the Intel database (no one else will have this info). By way of example, if a customer system is infected, the VLAN is instantly inserted and thus important IR&F data are not lost, and there is no risk of further exposure or data loss.

By way of further example with reference again to FIGS. 2 and 3, from the threat intelligence optimization 12, not only are Tier 4 analysts alerted, but also two different scenario based approaches for a customer are made available to lower response time to incidents, and also help mitigate or manage incidents better.

Active Honeypot (Active Defense)—An alert is processed by a TIO 12 (threat optimization suite). Consider the example where four computers have been tagged as visiting a malicious dynamic DNS based host based in China, from there those hosts are accessed via WMI or Windows API and the VLAN tag associated with those hosts is changed. This tag will maneuver these hosts to a quarantine. An Active Defense Quarantine mimics the internet, with fake DNS, faked IP addressing, fake services, and attempt to keep the computers running while a second part of Active Defense is deployed. The second part of Active Defense is an automated Incident Response. Once the machines have been tagged by the TIO and an alert has been sent to analysts, the analysts may enact a memory forensics program, a script to copy a memory dumping executable to the machines and dump the physical memory in order to capture the malicious content that may be installed on the machines. This is done through scripting xcopy, and using commercial memory forensic tools. The active defense is thus to isolate, contain, surge and recover from incidents faster, and allow creation of further intelligence for incident response teams that may deployed to the client.

Data Gathering

Data Gathering takes place on a large scale, including detailed netflow information and ongoing link analysis, profiling of companies, users, machines, and external contacted IPs, as well as analysis from Honeytrap activity. Each customer's installation will track this information locally and send selected data back to the central location, Foreground™ by way of example, for comparison across multiple companies. This allows the analytics subsystem 44 to discover industry-wide trends and emerging threats. Subscribing to a variety of open-source and limited-distribution feeds, features and benefits of Threat Intelligence continue to improve. These are currently being compared to each other and will be used to recognize omissions and false positives from individual Intel Sources. Additional tools such as web crawlers may be used to augment the Threat Intel data with publicly available information not specifically designed for security use. All these data will be normalized to automatically construct alerts, warnings, and threat intelligence customized to a customers' need.

Further with regard to a data gathering Component 45, intelligence gathering is provided that includes building an identical operating environment using virtualization technology. After an alert has been given off by the TIO 12 the customer can choose to utilize military strategy in order to thwart adversaries such as replicating environments that are being attacked in real-time through automation of vmware clones of DNS, Mail, WebMail, AD, Finance Servers, Network File Shares. When attacked the opportunity exists to deceive adversaries.

The TIO 12 alerts analysts who set in motion the automated move of infected computers to an isolated VLAN. By way of example, the customer decides that there is likely an adversary with a motive to harm on a particular monitoring box or boxes. Automated Program using a vmware esx server application program interface stands up 3 replicated machines that appear in the isolated VLAN, using the same hostnames and addressing scheme as the "real" operating environment. The malicious code running is kept running in memory or is prevented from connecting to the internet so that the adversary still performs the techniques in real-time that can be monitored by full packet capture and Tier 4 analysts in order to create indicators of compromise to match the adversaries movements on the cloned environment. This will also have the dual benefit of allowing for intelligence gathering against the adversary as the analysts will capture what specifically the adversary is after, what types of information, whether the adversary knows who to target for what, whether the adversary has done his homework, whether the adversary is already familiar with the internal network, etc.

With reference again to FIG. 1, data normalization and fusion 18 take place, wherein data the analytics 24 brings the process together. The Threat Intel DB automates analysis of all normalized Data. Analysts may investigate anything that appears. Once data is normalized/fused it can be sent into the Big Data Analytics platform where machine learning code can perform specific automated analysis including by way of example: Baselining (Systems, Networks, etc.); Statistical Analysis; Anomaly Detection; and Near Real-time correlation (which a human cannot do). An example to consider includes: A user logs in remotely from a geo-IP that is not normal, during a time frame that is not normal and accesses a critical system they don't normally access. At what point does it trigger? One will base this on weighting of assets (systems, network segments, types of data) and by overall learning of machine code.

Automated Threat Detection and Mitigation

With reference again to FIGS. 2 and 3, the Threat Intelligence segment 30 draws information from a wide variety of the external sources 34, normalizing the data from each of them and storing it in the central database 42. The system 10 will also work with the analytics subsystem 44 to track the accuracy and relevance of different sources. In addition, suspicious patterns are fed to the central database 42 and a customer database 50 to automatically query security tools in the customers' environments.

The Data Gathering component 45 includes a set of tools for gathering a broad set of data from many publicly available websites. It is intended to provide context for the analytics system. Natural language processing and broad economic, financial, and political data will help the analytics system understand and predict hacktivism, state-backed hackers, and industrial espionage.

The Honeytrap 20 includes systems or processes deployed within individual customer networks. These will watch for scans and other attacks, and will analyze suspicious activity, feeding more data into the analytics segment. They will monitor specific sets of files used by adversaries on compromised computer, forming the basis of an early alerting system. They will be customized to their particular locations, and may automatically incorporate infected machines, quarantining them.

The Analytics subsystem 44 will unify sources of data, and will use machine-learning tools to find and exploit patterns within the gathered information. Customer-specific databases and the central incident database provide extensive records on how and when attacks have occurred. This information provides feedback to guide the machine learning. This internal information will be combined with the external, contextual data to provide a detailed analysis of attacks.

The Portal 22 above described with reference to FIG. 1 is herein described by way of example as including includes two parts, the analyst portal 46 and the customer or client portal 48, illustrated with reference to FIG. 2. The analyst portal 46 will allow analysts to query the Customer Database 50 and incidents detected by the system 10 (via patterns from the Threat Intelligence segment 30). It operates to direct incidents toward the analysts most suited for dealing with the specific attacks and affected assets. It tracks various metrics of analyst performance and provides feedback to the system. The customer portal 48 allows managers to view analyst performance metrics as well as customize their threat intelligence feeds, local security tools, and descriptions of the customer's environment and assets. These choices will provide further feedback for the system 10.

Threat Intelligence

With reference again to FIG. 3, one portion of the Threat Intelligence subsystem 30 which is directly responsible for ingesting data from the multiple Intelligence Sources 34 is the Reader 32. For the embodiment herein described, by way of example, the Reader 32 has a modular design that minimizes the amount of coding that needs to be done to add each additional Intelligence Source 34, thus allowing new sources to be added quickly. The Reader 32 places data from each source 34 into a standard format, and then passes the reformatted data to the Gatekeeper 36. Although nominally aimed at understanding a variety of the external Sources 34, the Reader 32 can also handle threat intelligence produced by predictive or investigative routines within our system. This allows patterns produced by the analytics engine to be used automatically.

The Gatekeeper 36 functions to takes data from the Reader 32 and assigns a "believability" based on past performance of each intelligence source and the similarity of new patterns to data associated with past events. This helps recognize patterns that will likely produce False Positives. Depending on the result of this analysis, the prospective pattern may be dropped entirely, fed directly into the incident database, or referred to a human analyst for a decision.

The Filter 38 compares each piece of threat intelligence in the incident database to the data associated with each of the customer's enterprise security devices or tools 52. It has a modular design analogous to that of the Reader 32, allowing the system 10 to easily support a number of enterprise security devices. When suspicious events are found, these are passed to Investigator, which researches additional details. Detailed incidents are then passed from Investigator through Filter to the incident database.

The Investigator 40 incorporates an array of automated tools to fill in data associated with suspicious events it gets from the Filter 38. Whenever an event is detected, the Investigator 40 queries any of the customer's enterprise security devices, and may be able to provide further information. This produces a more detailed picture of the event, affected machines, users and applications. The Investigator will also query external reputation databases, geo-location data, and other potential sources of information to learn more about the programs and external entities involved in an incident. The investigator also reaches out to Internet databases such as "who is" databases in order to perform malicious domain lookups and compare registrations across domains alerted by threat intelligence. In addition, the Investigator will query the analytics engine for relevant information. Taken together, this quickly provides a detailed record of each incident that can be presented to the analyst. This saves the analyst time and speeds research and understanding of each incident.

Threat Intelligence Flowchart

Figure 4:
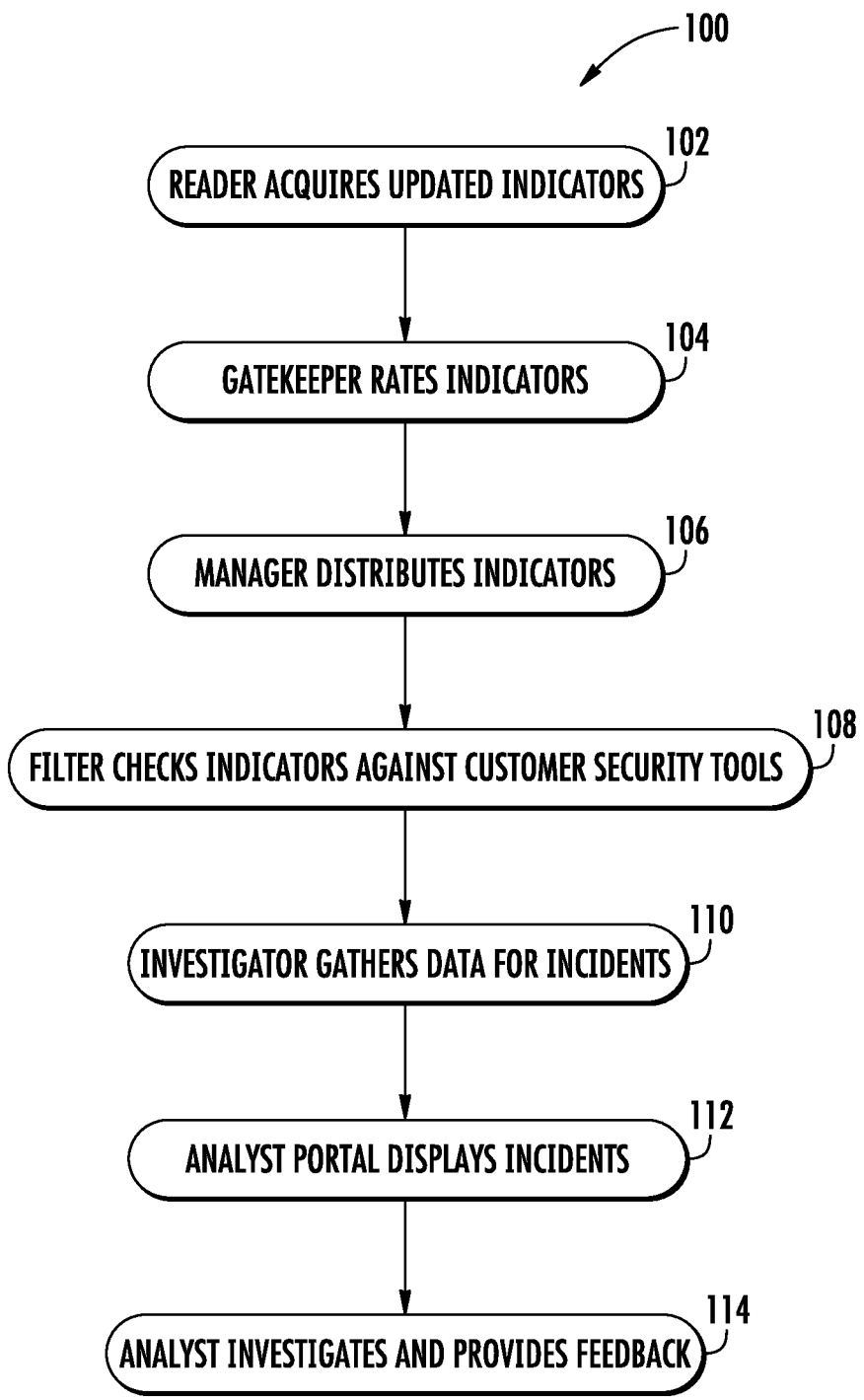
FIG. 4 is functional flow chart illustrating one sequence of actions carried out by the Threat Intelligence operations.

FIG. 4 illustrates a process 100 or sequence of actions carried out by the Threat Intelligence subsystem 30. By way of example, the Reader 32 initially gathers data 102 from a wide variety of threat intelligence sources, including commercial and open-source feeds as well as suspicious patterns identified by the Analytic subsystem 44 or specified by the analysts or customers through the appropriate portal 46, 48. The Reader 32 includes software that normalizes the data by putting it in a common format, as earlier described. This normalization 18, described with reference to FIG. 1, includes an initial believability based only on the past performance of the relevant source of the Intel. The Gatekeeper 36 then reviews 104 the gathered intelligence and compares it to past incidents and other rules described by the Analytics subsystem 44. This refines the believability and severity of each indicator. If the believability is too low, the Gatekeeper 36 will either ask a human to check the Intel or discard the indicator as unusable and overly likely to generate false positives.

The Manager component distributes 106 the resulting normalized threat intelligence to the customers. If the indicator was data tagged by industry or company, those tags will result in higher believability or severity for the specified targets, and lower believability and severity for others.

The Filter 38 acquires the indicators from the manager and sorts 108 the indicators by severity and believability. Each of a customer's security tools is queried, and centralized watch lists may be automatically generated which are then pushed out to the relevant security tools. When either the queries or watch lists generate a result, the resulting event is passed to Investigator 40, which component of the Threat Intelligence subsystem 30 performs link analysis 110 (which is later presented as an automated option to the analyst in the reporting part of the portal) and queries the analytics subsystem and all the enterprise security devices to provide a complete context for the incident. The Investigator 40 may revise the severity and believability based on its findings. Identified incidents are given 112 to the portal, which provides feedback in the form of the analysts' reports. These reports are then used to improve the operation of each component of the Threat Intelligence subsystem, wherein analyst feedback may be provided 114 as appropriate.

Add Customer Activity

Figure 5:
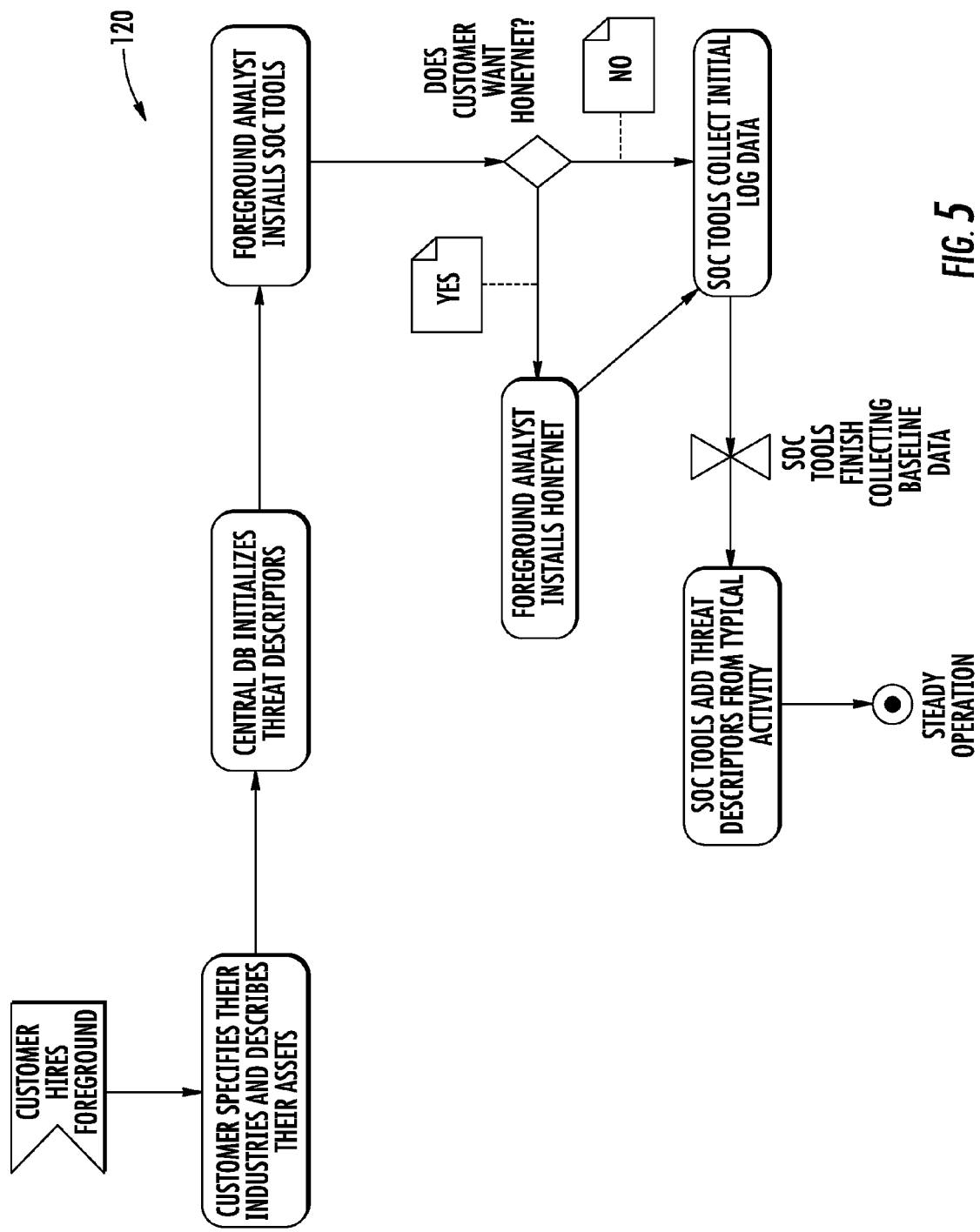
FIG. 5 is a flowchart for one process of adding a new customer/user, by way of example.

FIG. 5 illustrates one possible flowchart, by way of example, for a process 120 of adding a new customer/client. Ideally, the customer will be able to provide a detailed description of their industry, major rivals and likely attackers, of the computers on their network, and of the external companies they regularly contact. All of these data will help customize threat intelligence and tools to provide more cost-effective protection & monitoring for the customer. In practice, much of these data will be partial or unavailable. The incident/customer database will generate the initial threat descriptors based in part on whatever information the customer has provided. Various monitoring tools will then be installed on the customer's system to begin monitoring. If the customer wants use of the Honeytrap option, it too will be installed. Once the software is installed, the security operations center (SOC) tools will begin collecting log data. This will develop baseline information, which can be used to fill in gaps of the customer's knowledge. Once a suitable baseline has been established, additional threat descriptors can be added into the customer's local database. These descriptors may be generated either from specific non-standard signatures in the incident database, or based on expected & typical use of the customer's machines. Once these additional signatures have been put in place, the customer will shift to a steady-operation mode.

Add Customer Interaction

Figure 6:
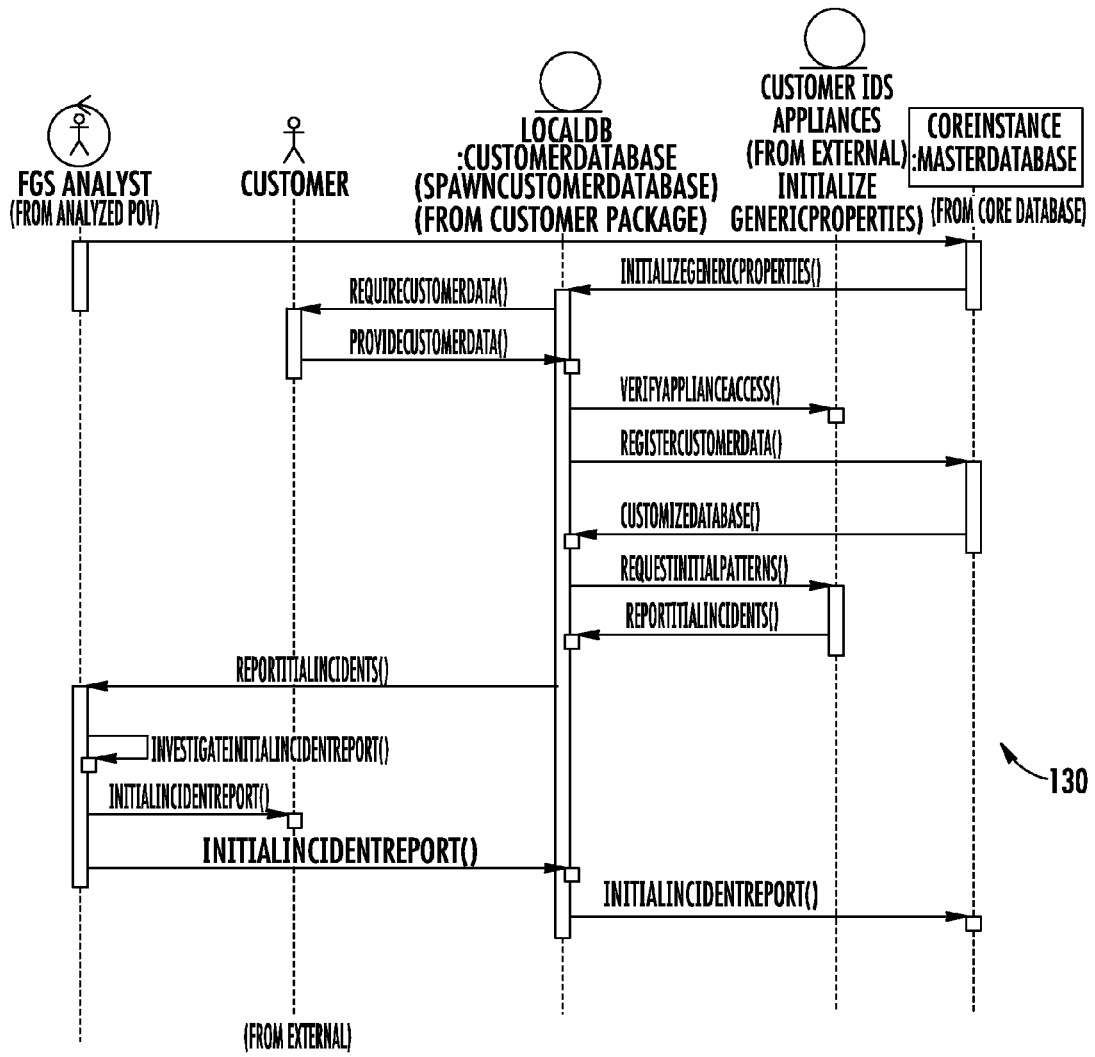
FIG. 6 is a flowchart illustrating the addition of a customer/user as illustrated with reference to FIG. 5, but with an emphasis where an analyst instructs the incident database to generate a new customer database.

FIG. 6 illustrates much the same information and process as the Add Customer Activity process 120 of FIG. 4, but with a different emphasis. In this one, the analyst tells the incident database to generate 130 a new customer database. The master database does this by initializing generic properties of the customer database. The Customer then fills in data in response to queries (or a form) from their new local database. Once it has the requisite permissions, the customer database confirms access to each of the IDS appliances in their environment and registers the information with the incident database. The incident database responds with any customization data and additional threat intelligence the customer database needs. The customer database then queries an intrusion detection system (IDS) to determine if there is anything on the system, which is clearly bad. This information is then given to the analyst, who investigates these incidents and reports them to the customer, customer's database, and the foreground central database. The base lining of the customer's system will be an ongoing process, which begins once appliance access, is verified and continues through the initial incident reports. Many of the explicitly shown steps along the way will be repeated during and after this base-lining process.

Adding Threat Signatures (Suspect and Trusted)

Figure 7:
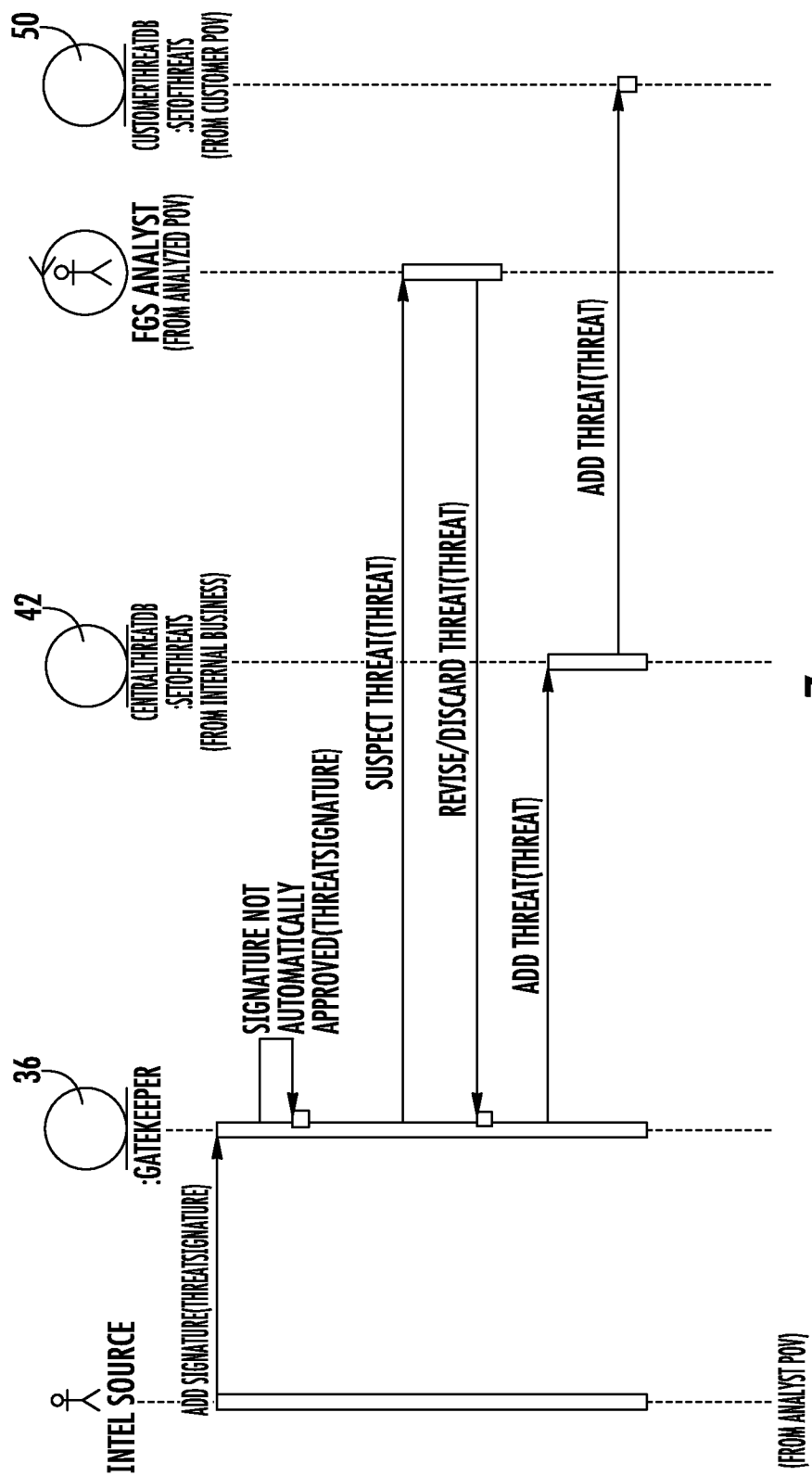
FIGS. 7 and 8 are flowcharts illustrating information from a source being directed to a Gatekeeper.
Figure 8:
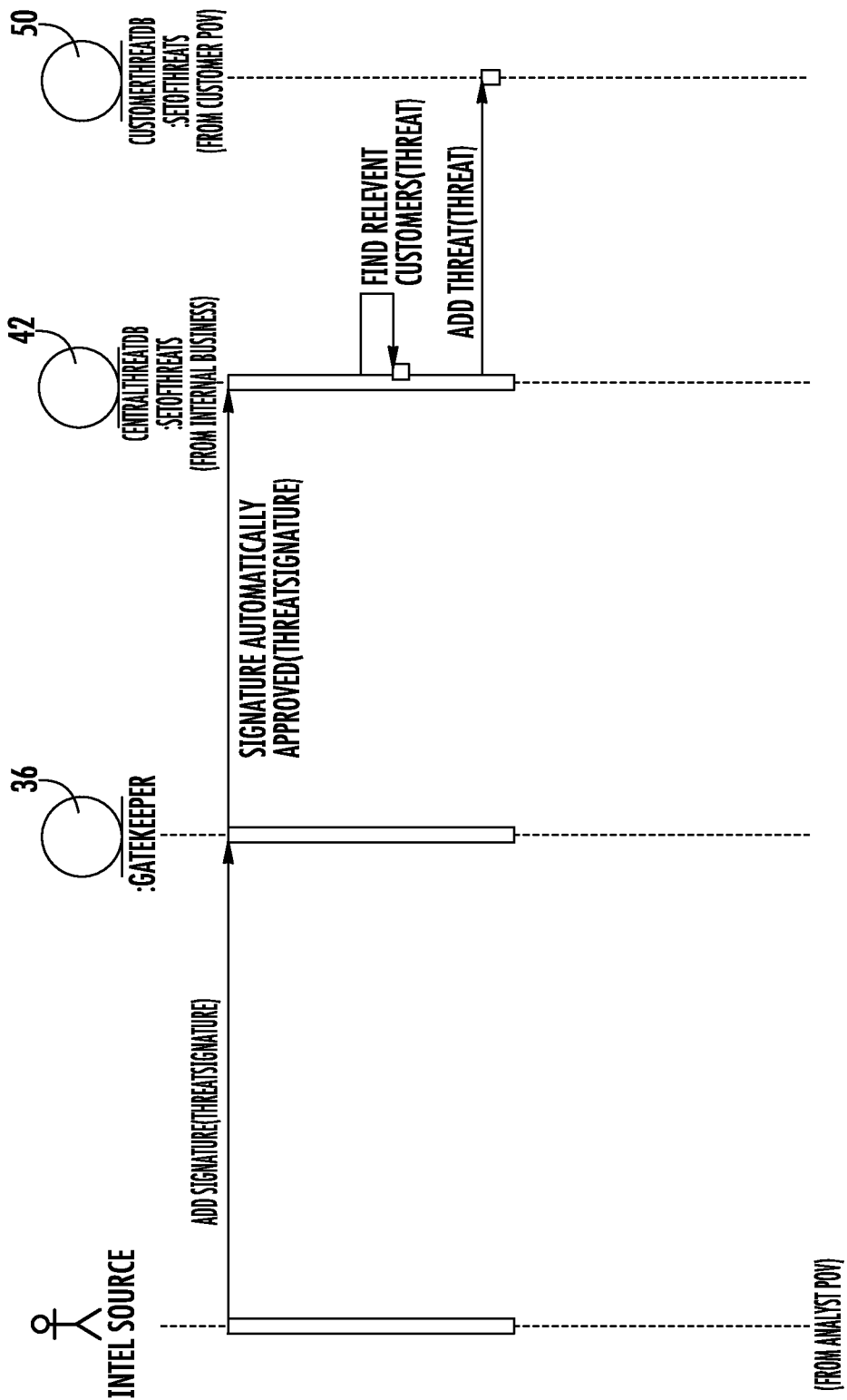

FIGS. 7 and 8 illustrate much of the same processes, but for different results at the Gatekeeper 36. By way of example, a Signature comes in from an intel source, and (after normalization), is passed to the Gatekeeper 36, where the Gatekeeper determines the believability of the input data, based on some or all of the following factors: 1) Historical/assumed Believability of the intel source; 2) if the new signature matches any existing incident reports, it should appear more often in True-Positive reports and less often in False-Positive reports; 3) Explicitly whitelist or probably-okay rules will compete with the Threat Signature; 4) Overly-broad signatures that trigger on very broad data sets are likely bad; 5) Signatures that duplicate ones already in the database will not be inserted, but may alter the severity and believability associated with the existing Threat Signatures. These criteria will help set the new Signature's Believability and Severity. Depending on the resulting values, the Gatekeeper will either trust the signature or add it to the central database, or request human review of the Signature. After human revision, the new threat will either be discarded (case not shown), or added to the incident and customer databases.

Advanced SOC: Analyst-Dominated, Analyst-Paced, AutoSOC-Driven

Figure 9:
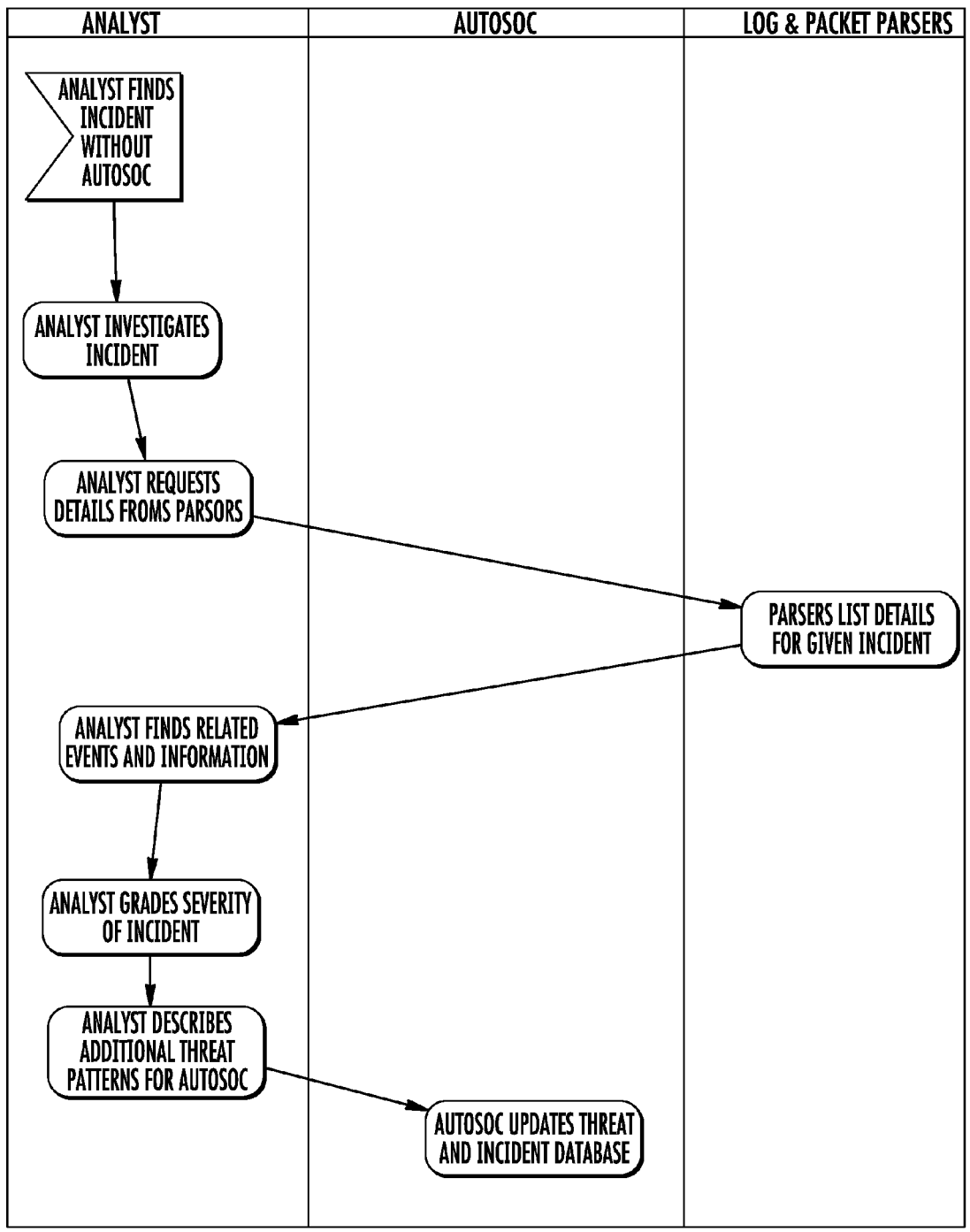
FIGS. 9, 10 and 11 show illustrate multiple workflows for an analyst using an automated Security Operations Center (SOC) system according to the teachings of the present invention.
Figure 10:
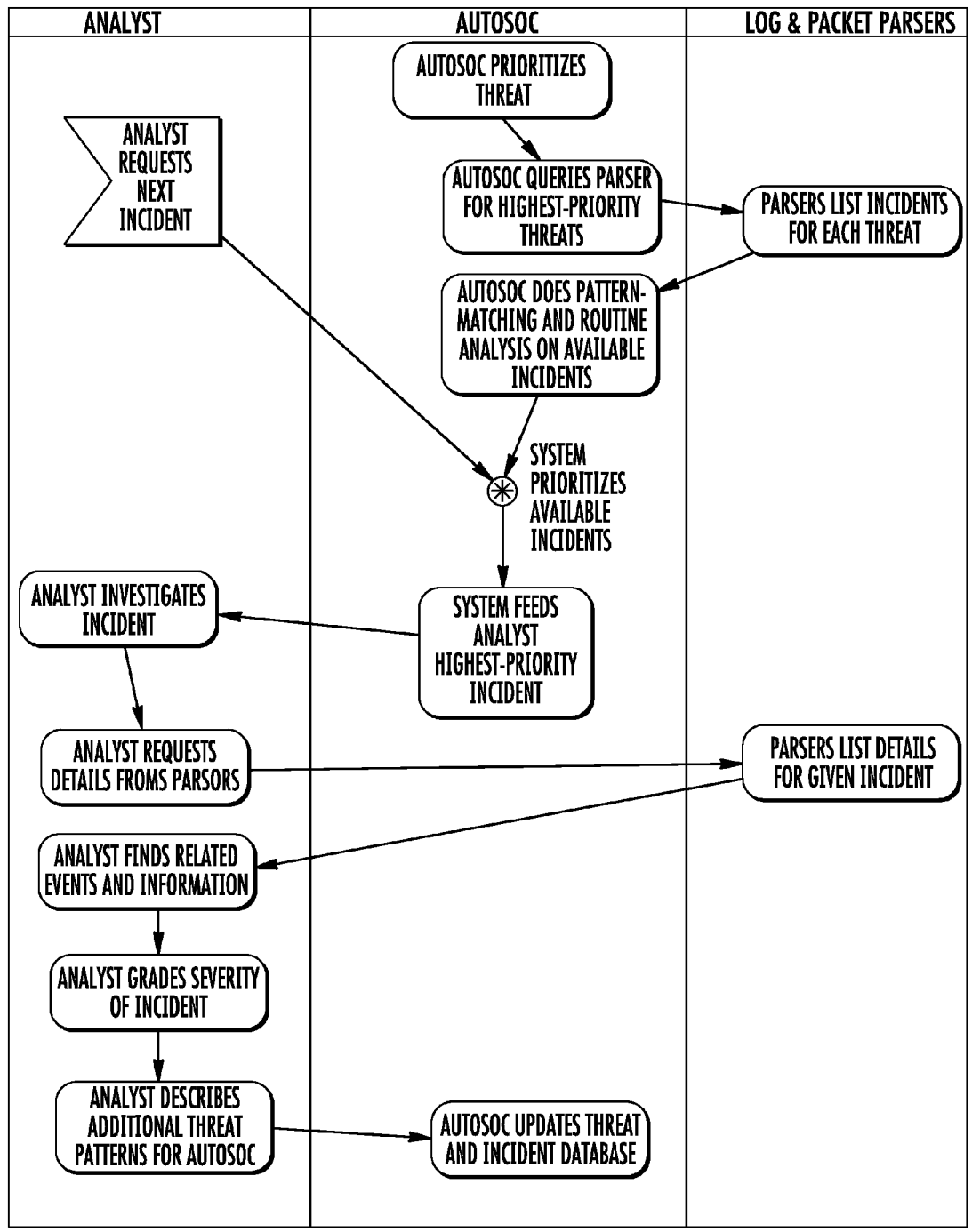
Figure 11:
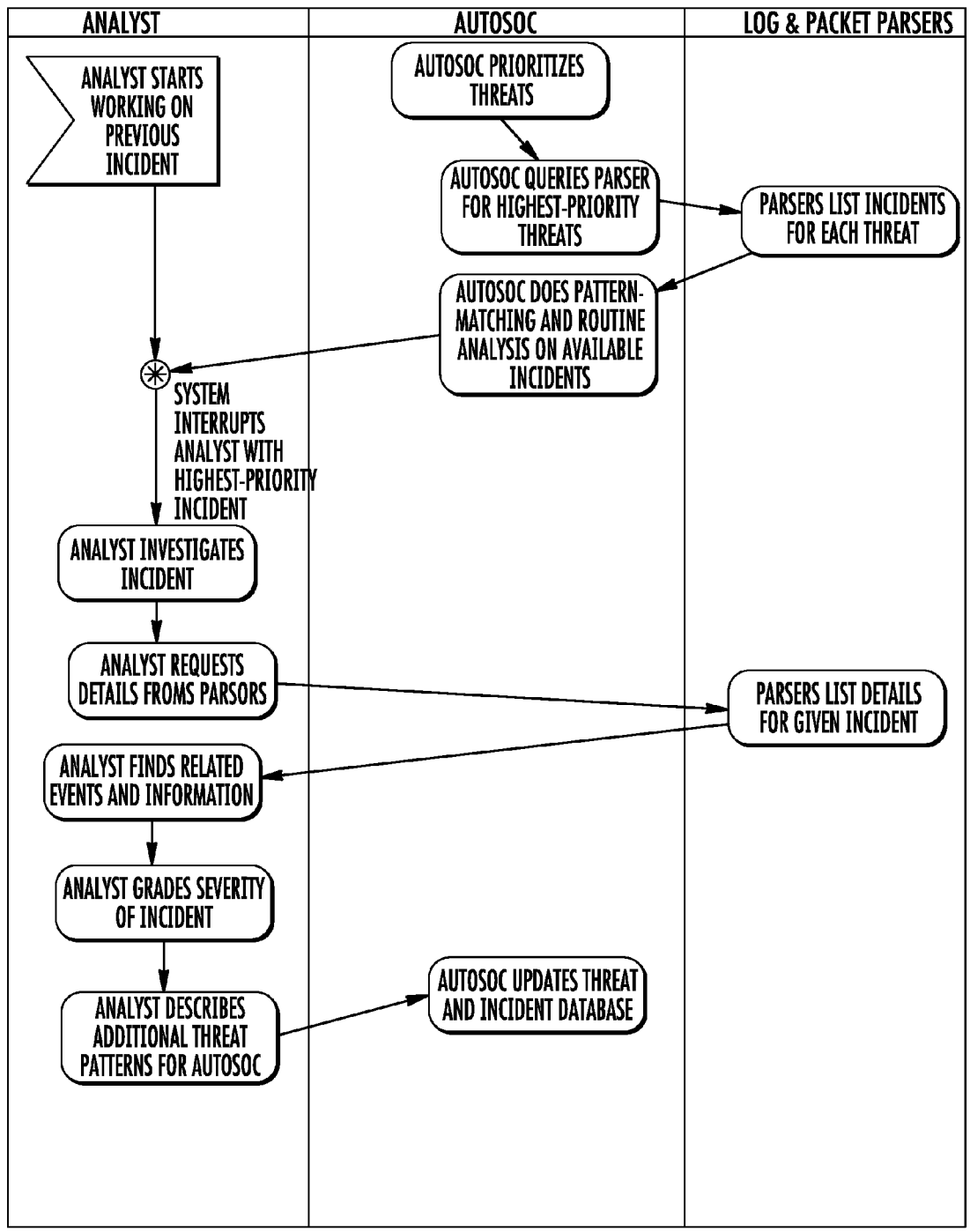

FIGS. 9, 10 and 11 illustrate multiple workflows for an analyst using the automated SOC system. Currently the analyst-paced version is the one that is closest to the operation of the analyst portal. Analyst-Dominated is the version, which is closest to the workflow in the majority of security operation centers. In each diagram, the AutoSOC/portal and Threat Intel is responsible for recording Incidents and maintaining the threat database. AutoSOC also communicates with the IDS appliances (called "Log & Packet Parsers" here) to find and prioritize events. In the Analyst-Dominated workflow, the analyst works quasi-independently of AutoSOC, finding incidents and events of interest on his own initiative. In the Analyst-Paced flow, the analyst works on one event at a time, and when he finishes one incident, AutoSOC automatically hands him the highest-priority incident. In the AutoSOC-Driven workflow, the automated system not only chooses the next event for an analyst, but can decide that sufficiently important/high-priority events can override the Analyst's current activity. In such a case, AutoSOC would store the Analyst's work and insist that the human work on the high-priority item.

Check for Threats

Figure 12:
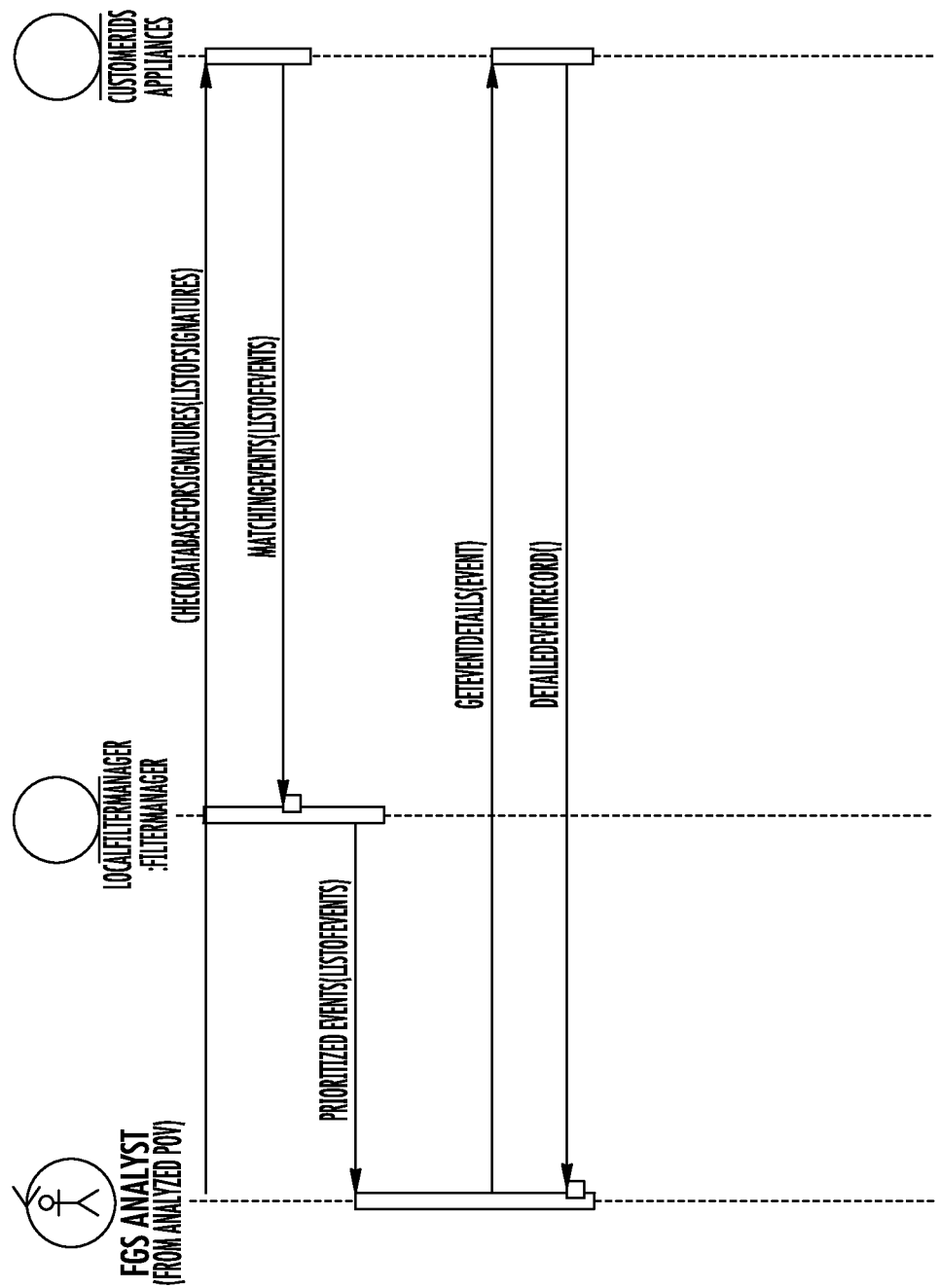
FIG. 12 is a diagrammatical illustration of another view of a sequence of calls between an analysts, a Filter subproject of Threat Intelligence, and customer's enterprise security devices, by way of example.

FIG. 12 illustrates a view of a sequence of calls between the analysts, the Filter subproject of Threat Intelligence, and the customer's enterprise security devices.

Gatekeeper Function

Figure 13:
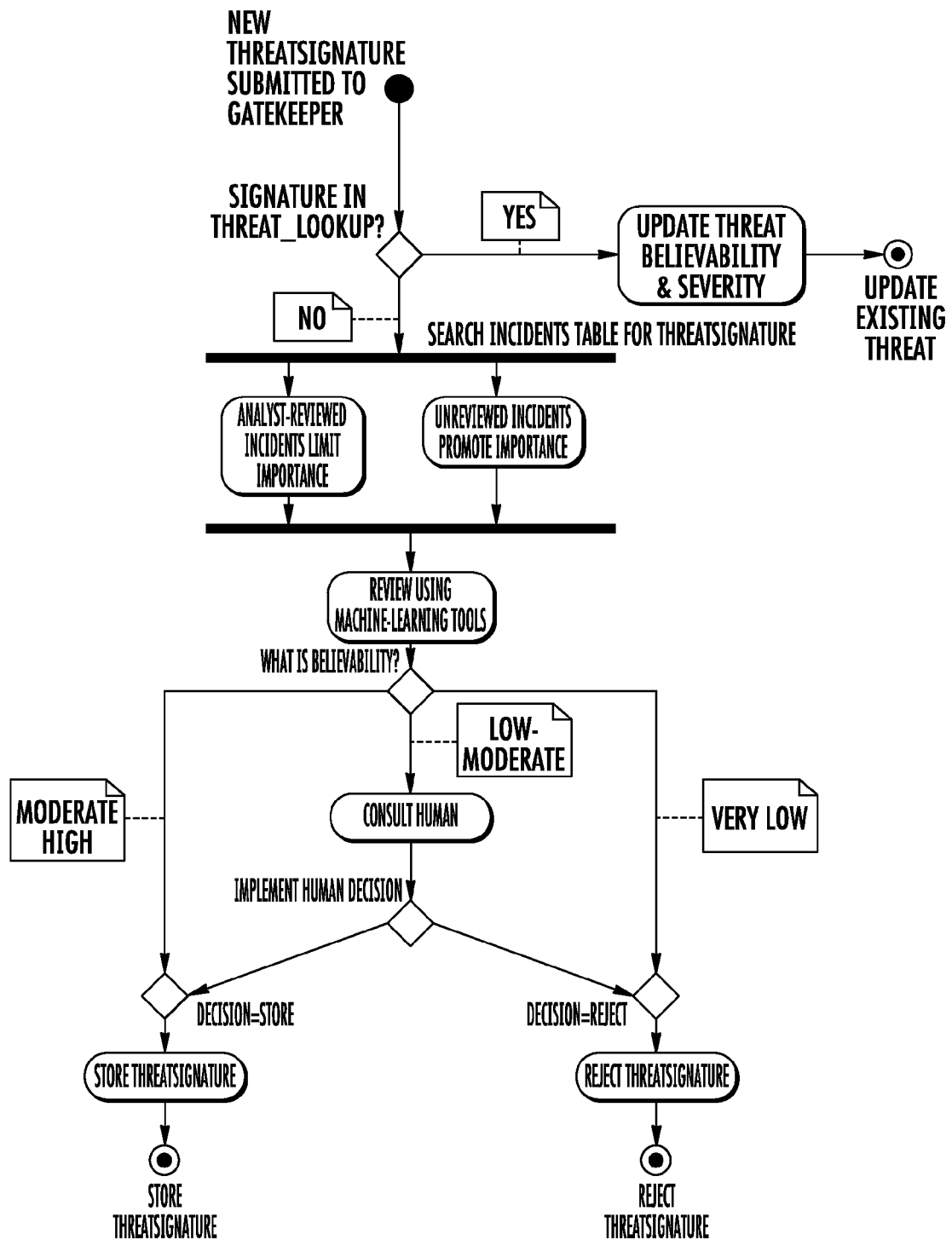
FIG. 13 is a diagrammatical illustration including decisions and actions to be taken by a Gatekeeper function for maintaining and improving quality of a threat intelligence database.

FIG. 13 illustrates decisions and actions to be taken by the Gatekeeper 36 to maintain and improve the quality of the threat intelligence database.

Process Incident Report

Figure 14:
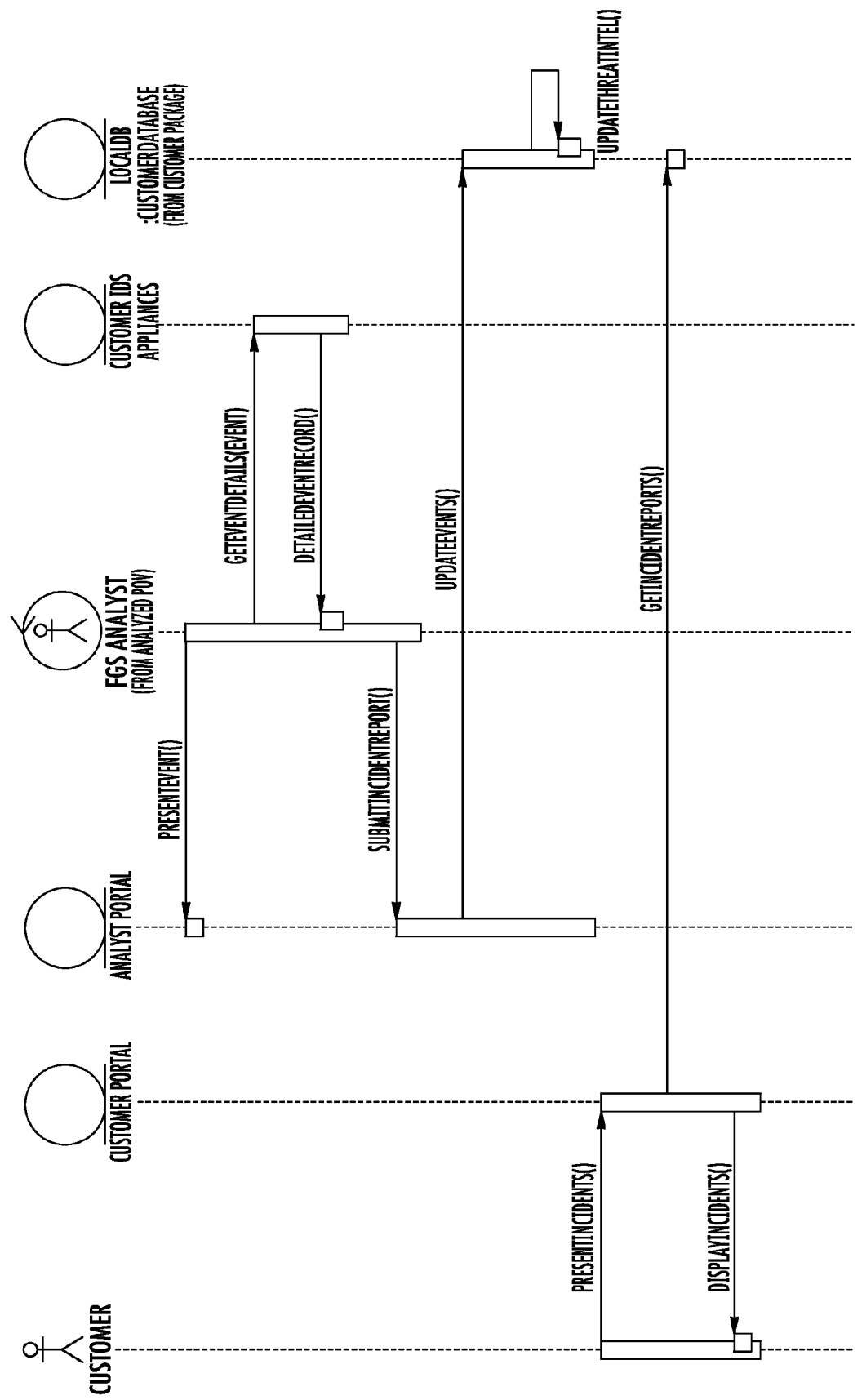
FIG. 14 illustrates, by way of example only, responsibilities and flow of data and requests as an incident report is processed.

FIG. 14 illustrates responsibilities and flow of data and requests as an incident report is processed. The Analyst initializes actions by asking the Analyst Portal 46 to present a particular incident from a list. The analyst then queries the Customer's security tools 52 to get more information about the incident. When the report is finished, the analyst stores it in the customer's database via the Analyst Portal 46. Later, the Customer can view the incidents via the Customer Portal 48.

Program Locations

Figure 15:
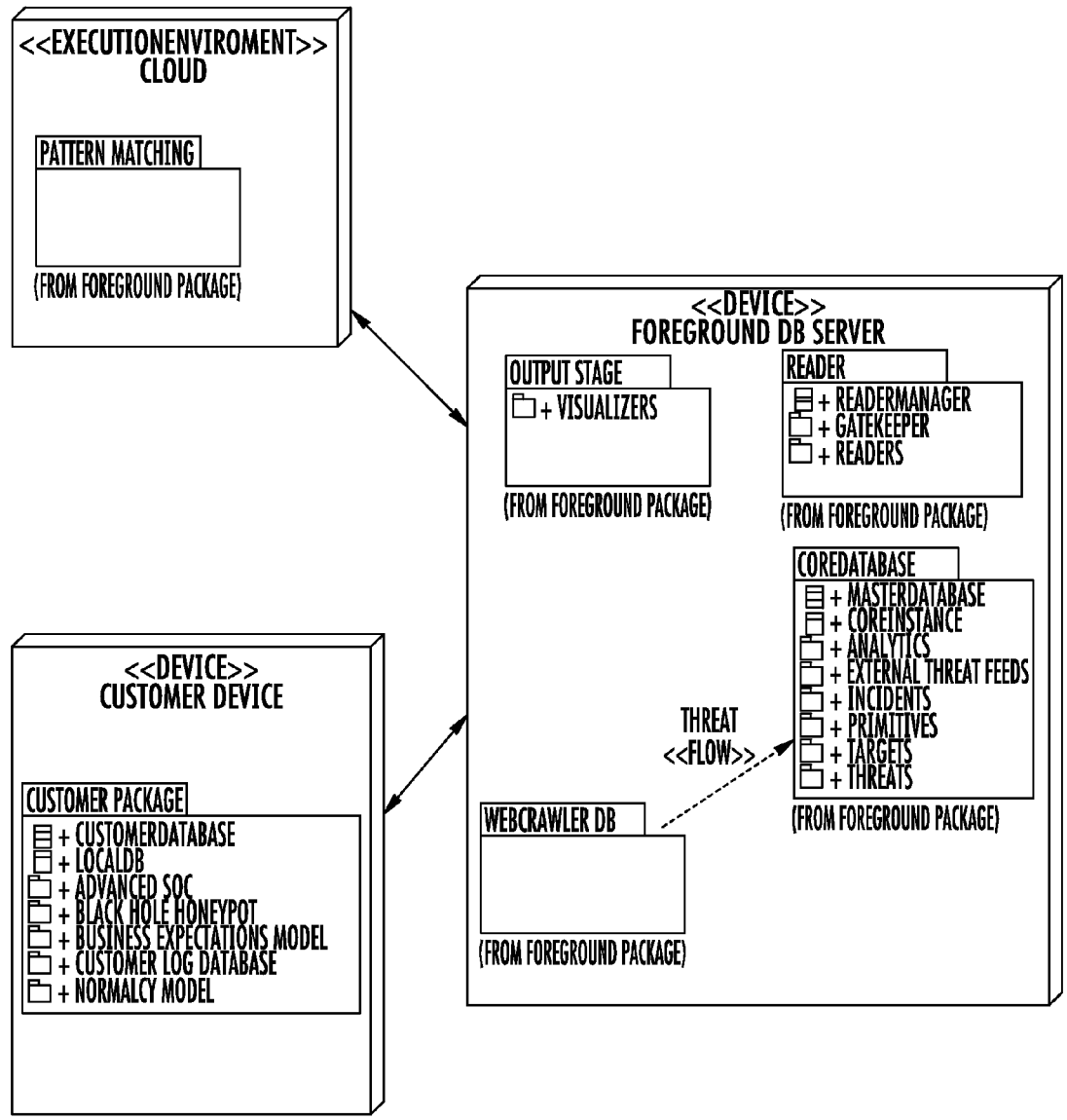
FIG. 15 is a diagrammatical illustration of one distributed nature of the system of FIG. 1.

FIG. 15 illustrates a distributed nature of the system of the present invention. By way of example, customer enterprise tools are located within the customer's environment to decrease network traffic and minimize the possibility of exposing sensitive customer data. The tools exchange summary information and threat intelligence with the central location, herein described as Foreground™. The Foreground™ server provides software updates and centralizes the collection and processing of threat intelligence, using cloud-based servers as needed to handle large data sets and heavy processing loads.

Query Logs Sequence

Figure 16:
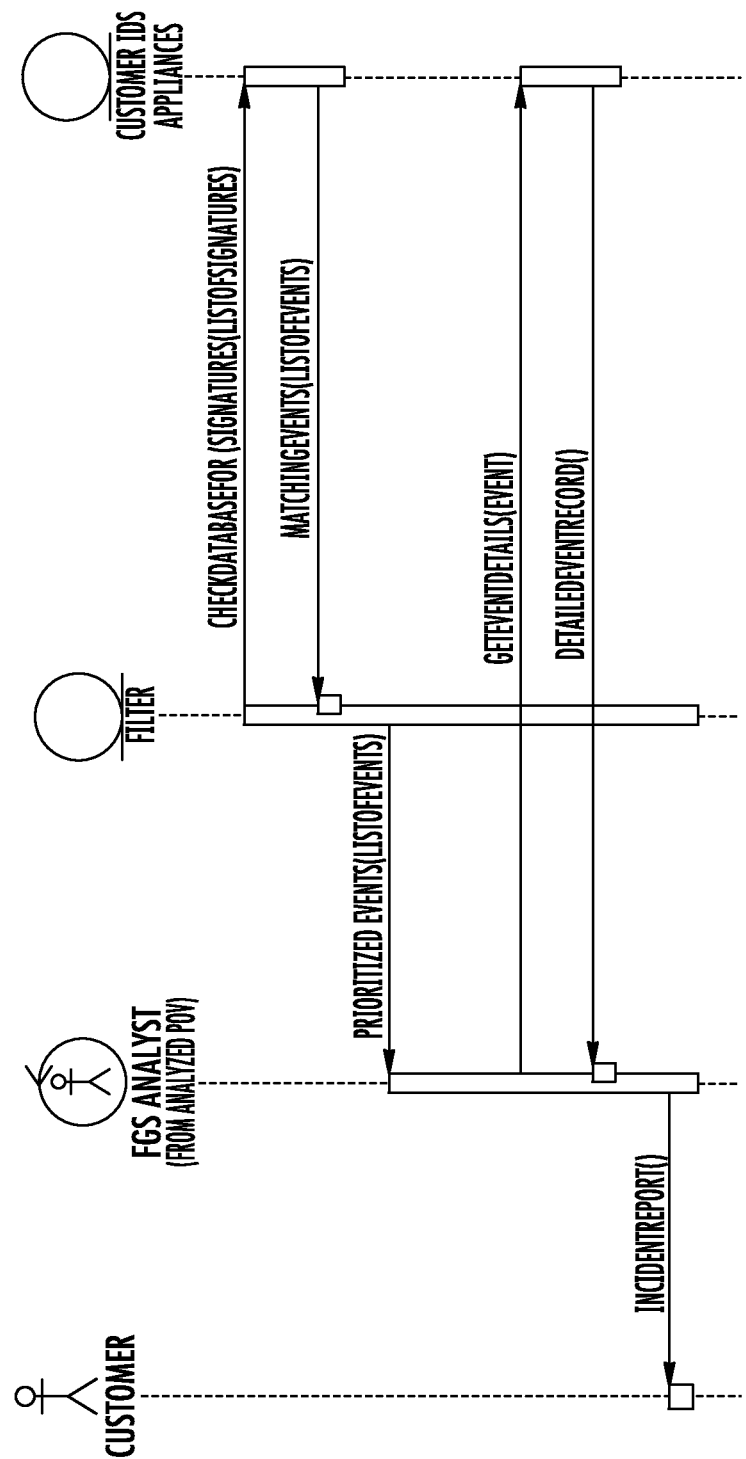
FIG. 16 is a diagrammatical illustration of one way in which the system of FIG. 1 produces data about events and incidents in a Customer's system.

FIG. 16 illustrates one of the ways in which the system produces data about events & incidents in the Customer's system. The Filter 38 programing is invoked regularly to automatically query each of the customer's enterprise devices. The Filter 38 gives the enterprise security devices a list of signatures, matching events are returned. The Filter 38 and the Analyst Portal 46 sort these events according to believability and severity, and pass the information to the Analyst. The Analyst can then make follow-up queries to the security devices or do additional research to get more information about these incidents, eventually producing a report which is passed on to the customer. Not shown are various automated steps. These allow the analyst's report to feed back into the believability & severity associated with different Threat Signatures and Intel Sources.

Threat Analysis

Figure 17:
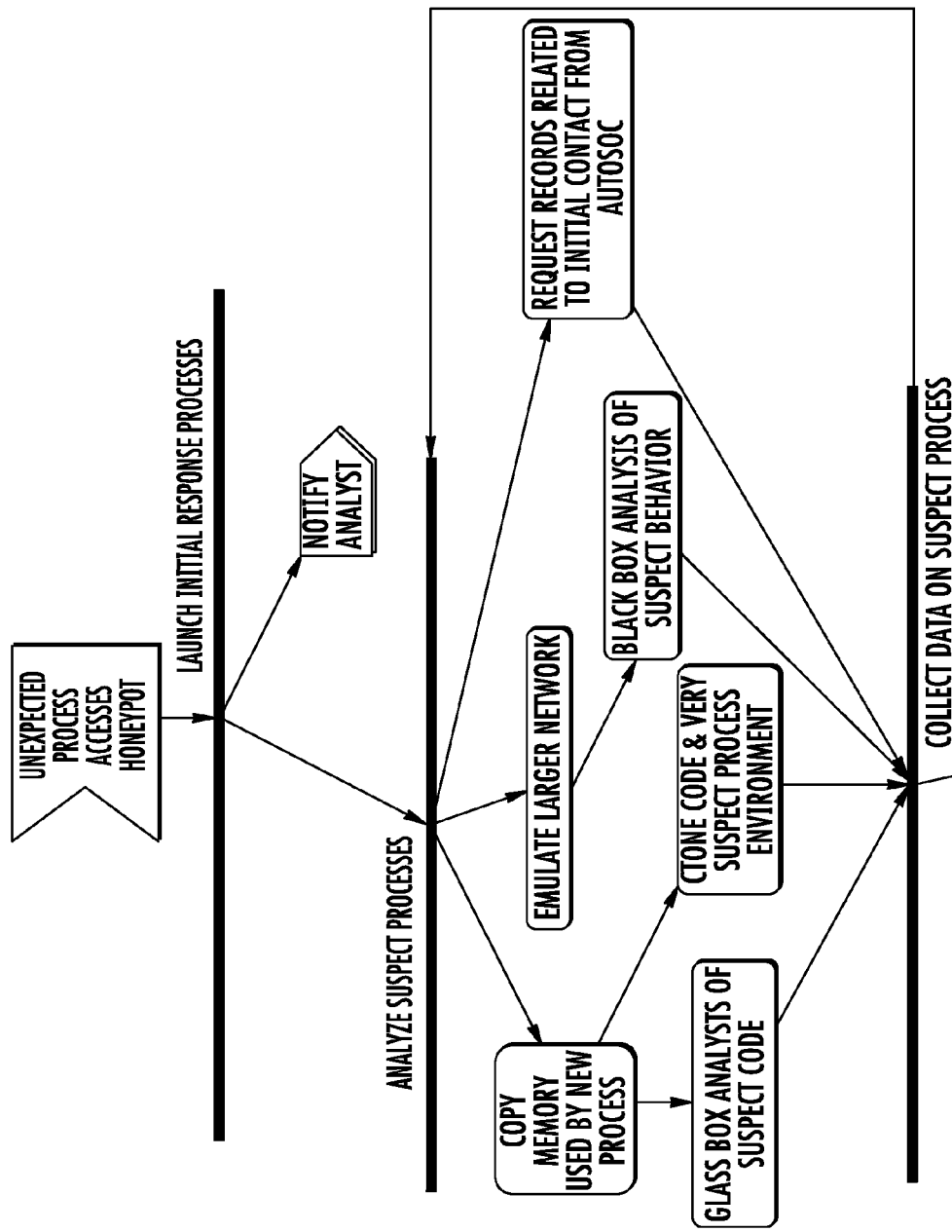
FIG. 17 diagrammatically illustrates one response of a Honeytrap to a new, unexpected process (which is presumed to be an attack), according to the teachings of the present invention;.

FIG. 17 illustrates a response of the Honeytrap 20 to a new, unexpected process (which is presumed to be an attack). The first step is for the Honeytrap 20 to alert the analyst (through the portal) and then to begin analyzing the suspect process. There are several techniques in which the Honeytrap 20 will attempt to figure out which traffic is malicious and then make intelligent decisions about what to do next based on the analytics engine. One of the main techniques used by the Honeytrap 20 includes being given a set of files used by an intruder or adversary. These files will reside on a compromised customer/client system. The Honeytrap 20 utilizes direct machine code access to the compromised system, makes the files zero bytes that are being used by the adversary, records the modified, access and created times of those files. The Honeytrap 20 then checks into the compromised system or system to see if the files have been access by an intruder recently. If the modified, access and created times are different then an alert is routed to the analyst. As part of the analysis, the Honeytrap 20 copies memory being used by the new/suspect process. This memory snapshot can be used to do memory analysis of the suspect code and to make clones of the code in slightly different environments to see how it interacts with different environments. While this is happening, the Honeytrap 20 is trying to emulate a larger network. If an active attack was found outside the Honeytrap 20, a VLAN switch & Network Address Translation may be used to redirect that attack to a virtual machine and a protected sandbox area. Increased, detailed logging of the suspect process's behavior may be used to do black box analysis of it. As a third branch of the analytics, the Honeytrap 20 may request records related to the initial contact from several locations including: the analytics engine/link-analysis, threat intelligence, and data gathering routines. This information is assembled into a report relating to the database 50. Analytics will continue until the report is sufficiently detailed to allow a well-informed response and vulnerability/threat mitigation, or until the analysis process stalls. In either case, the results are made available to the analyst through a report on the Analyst Portal 46. If possible, this report will also feed information into the Threat Intel database 42 for the Customer and Foreground.

Update Threat Descriptors Sequence

Figure 18:
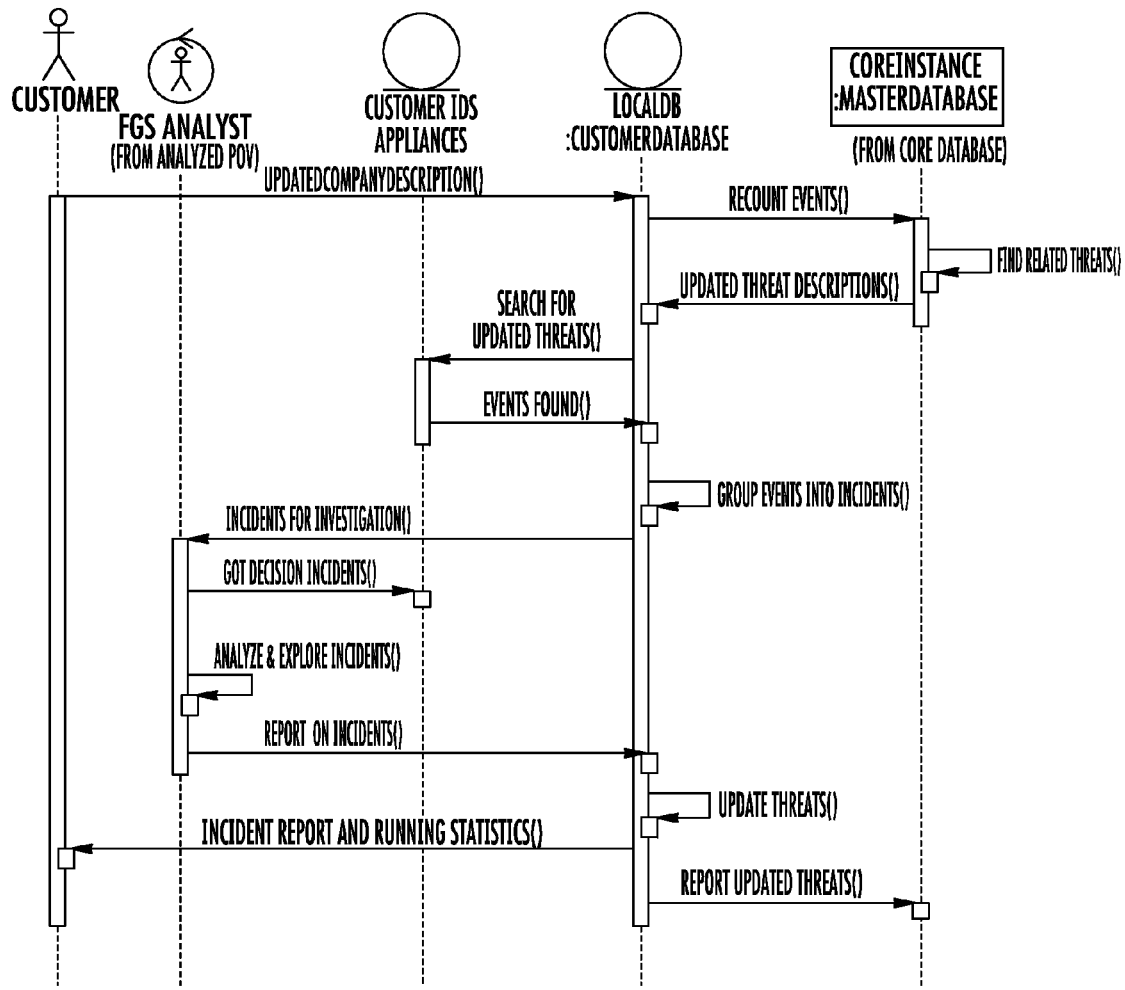
FIG. 18 illustrates one of the ways in which threat descriptors may be updated, by way of example.

FIG. 18 illustrates one of the ways in which the threat descriptors may be updated. The customer may add detail about their company or its assets (including, for example, the addition of a new server or software), but this is not required to update the Threat descriptors. In addition, the customer database 50 can report recent events and incidents to the Foreground core database. Based on the new incidents and any changes to the company, the incident database will find related Threats and send their descriptors to the customer database 50. When this happens, the customer database 50 queries local security devices for events. These events are grouped into incidents and sent to the analyst for investigation. The analyst investigates these events with the help of the IDS and other tools, and then provides a report to the customer database 50. The database then updates its internal threat descriptors' severity and believability using feedback from the analyst's report. Both the incident database and customer get reports on the incidents.

Analytics

Figure 19:
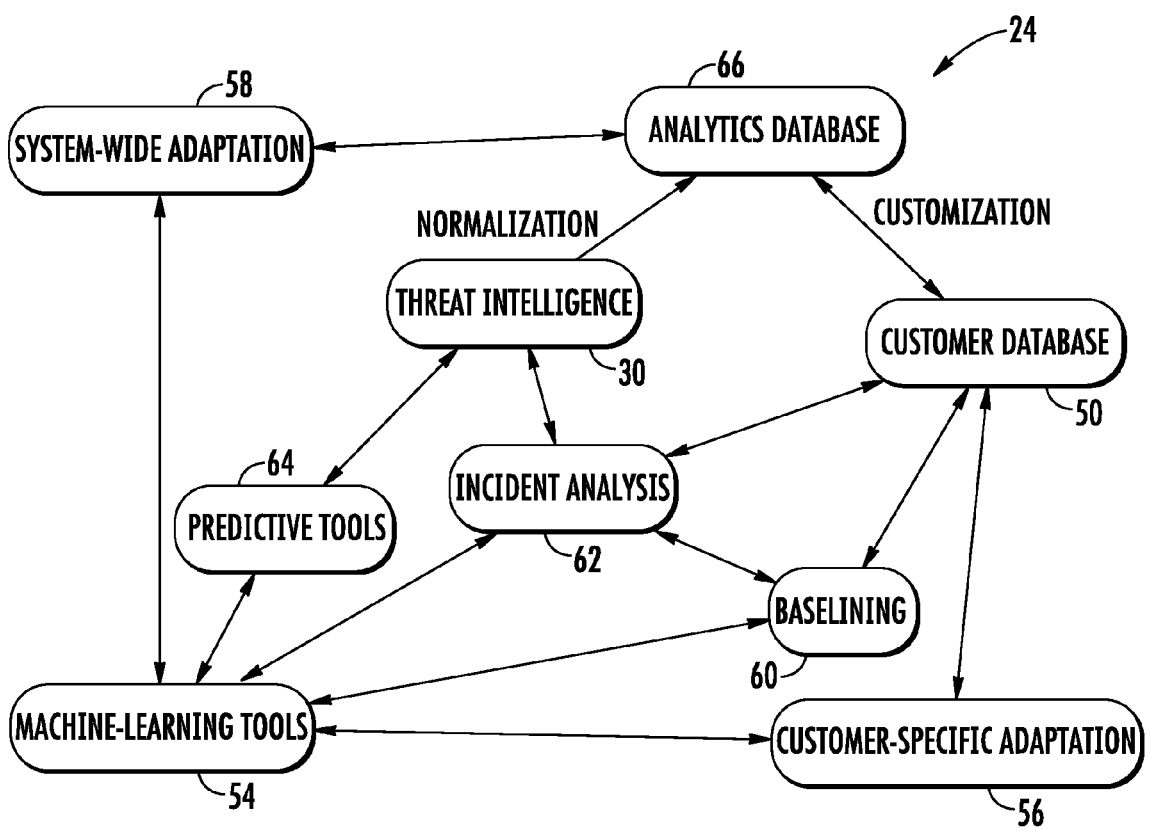
FIG. 19 is a block diagram illustrating an analytics system and relationship to other subsystems of the system illustrated with reference to FIG. 1, by way of non-limiting example.

FIG. 19 illustrates one analytics subsystem 24 and a relationship to other subsystems operable within the system 10. The core of the analytics 24 is an engine including a collection of Machine-Learning Tools 54. The machine learning tools 54 work by making predictions based on internal models. By way of example, as data is fed into the subsystem 24, the machine learning tools 54 compare their predictions to actual data and revise operating models accordingly. The feedback may come from any of the other portions of the automated threat detection and mitigation system 10, and is organized into a large database. Each of the machine-learning tools 54 is aimed at answering a specific question. As feedback optimizes machine-learning algorithms, these questions can be answered more accurately.

With continued reference to FIG. 19, one of the responsibilities for the analytics engine 24 is a Customer-Specific Adaptation 56. Questions such as "Which Intelligence Sources produce the fewest false positives?", "Which machines, applications, and users are most-frequently compromised?", and "Which external entities are most frequently involved in attacking this customer?" can be answered based on accumulated data. These questions can then be used to prioritize new threat intelligence and organize the responses to suspicious events. A System-wide Adaptation 58 asks questions analogous to those of customer-specific adaptation 56, but spread across all Foreground™ customers, by way of example. Baselining 60 constructs profiles for normal activity associated with particular customer machines and external sites. Typical patterns may involve time, file size, and pairings between users, files, internal machines, and external machines. Measuring and modeling these patterns can help identify unusual activity and unusual users. Incident Analysis 62 uses detailed information from the Investigator 40 and the customer's enterprise security devices or tools 52, earlier described with reference to FIG. 3. Each datum collected from these tools 52 can be compared to historical models established by the Baselining 60 process, and compared to data made available from the ongoing Data Gathering 45 and HoneyTrap 20 operations. This provides context to further identify possible malicious activity and to find which other machines may be vulnerable or already infected. Predictive Tools 64 attempt to answer questions such as "Would a human Analyst judge this incident to be a false positive?", "When are attacks most likely?", and "Which external events are most often correlated with each type of attack?"

Teacher-Pupil Analytics

The various components being tracked to make the analytics adaptive and generalizable to a wide variety of security-related database are addressed by a teacher-Pupil Analytics package. An Analytics Database 66 links to or replicates much of the information involved in the Threat Intelligence subsystem 30, including full incident records (including the Analysts' reports and feedback information.) It will also have the customers' baselining information, so that it can work from what it known about the usual flows of information, asset management, times at which particular sites are most accessed, etc. In addition, the analytics database will serve as a repository for external financial, security, and political information, which may be useful in predicting either the timing, or nature of attacks and which may be useful for providing context to incident response. The data in the Analytics Database 66 can be described in terms of a number of Properties or Dimensions, which correspond roughly to computer data types. Different Dimensions lend themselves to different sorts of statistical analysis, and this information will be included in the description of each available Dimension.

A large number of Pupils will be present, each of which is a particular machine-learning algorithm aimed at answering a particular question. Each Pupil includes all the information necessary to describe its algorithm. This information includes the Dimensions used by the algorithm, the general class of algorithm, and per-algorithm choices such as Distance Metric. A smaller number of Teachers will be available, each of which is dedicated to answering a specific human-posed Question about the analytic database and cyber security. The Teacher manages all the Pupils who share that Question. The Teachers will have metrics which can be used to grade how well each Pupil has done at answering the question in the past, including number of correct answers, as well as the time and memory necessary for each Pupil to work.

Figure 20A:
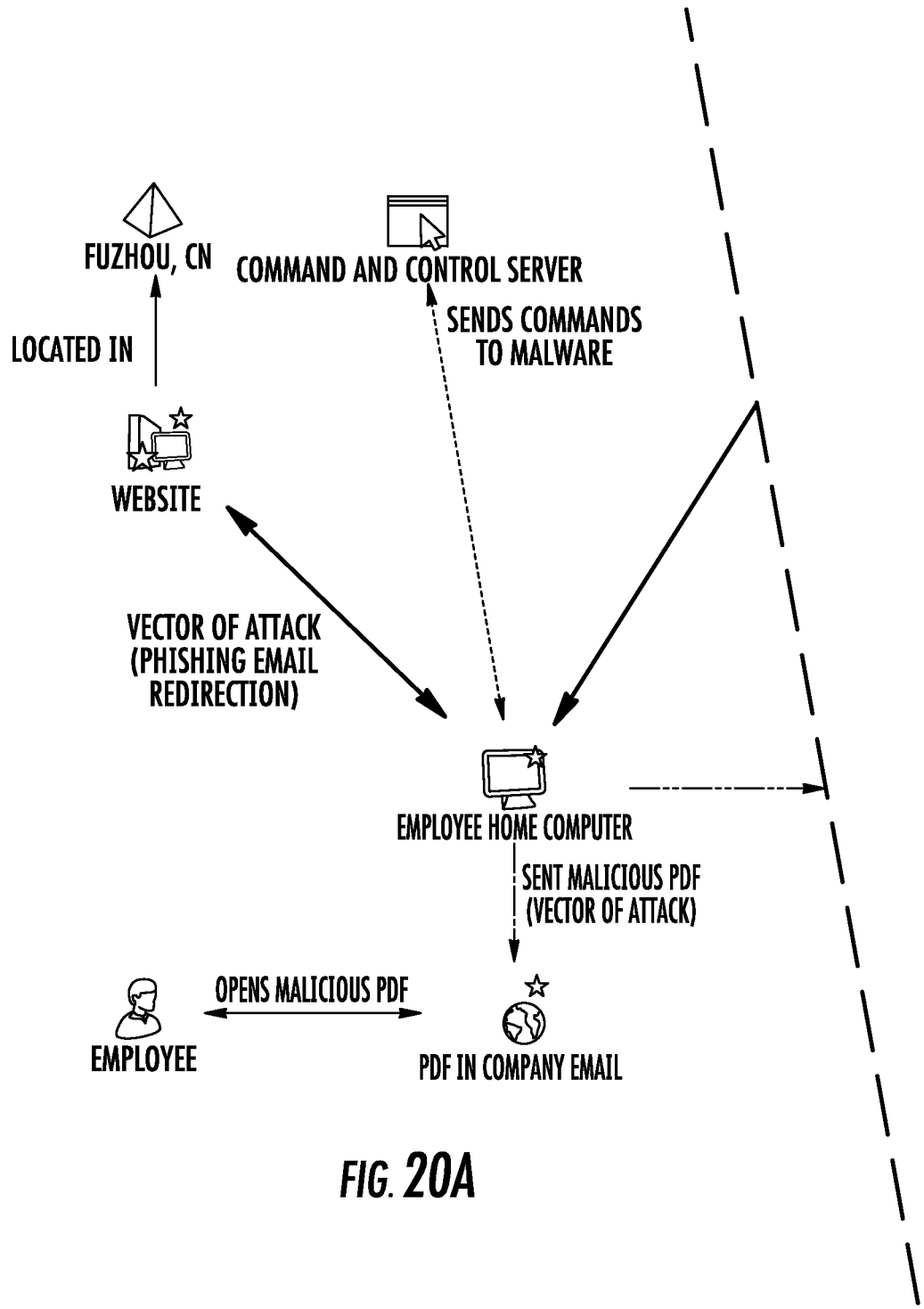
FIGS. 20A, 20B and 20C combine to form a flow chart illustrating one embodiment of a system employing various network portals for reporting threats.
Figure 20B:
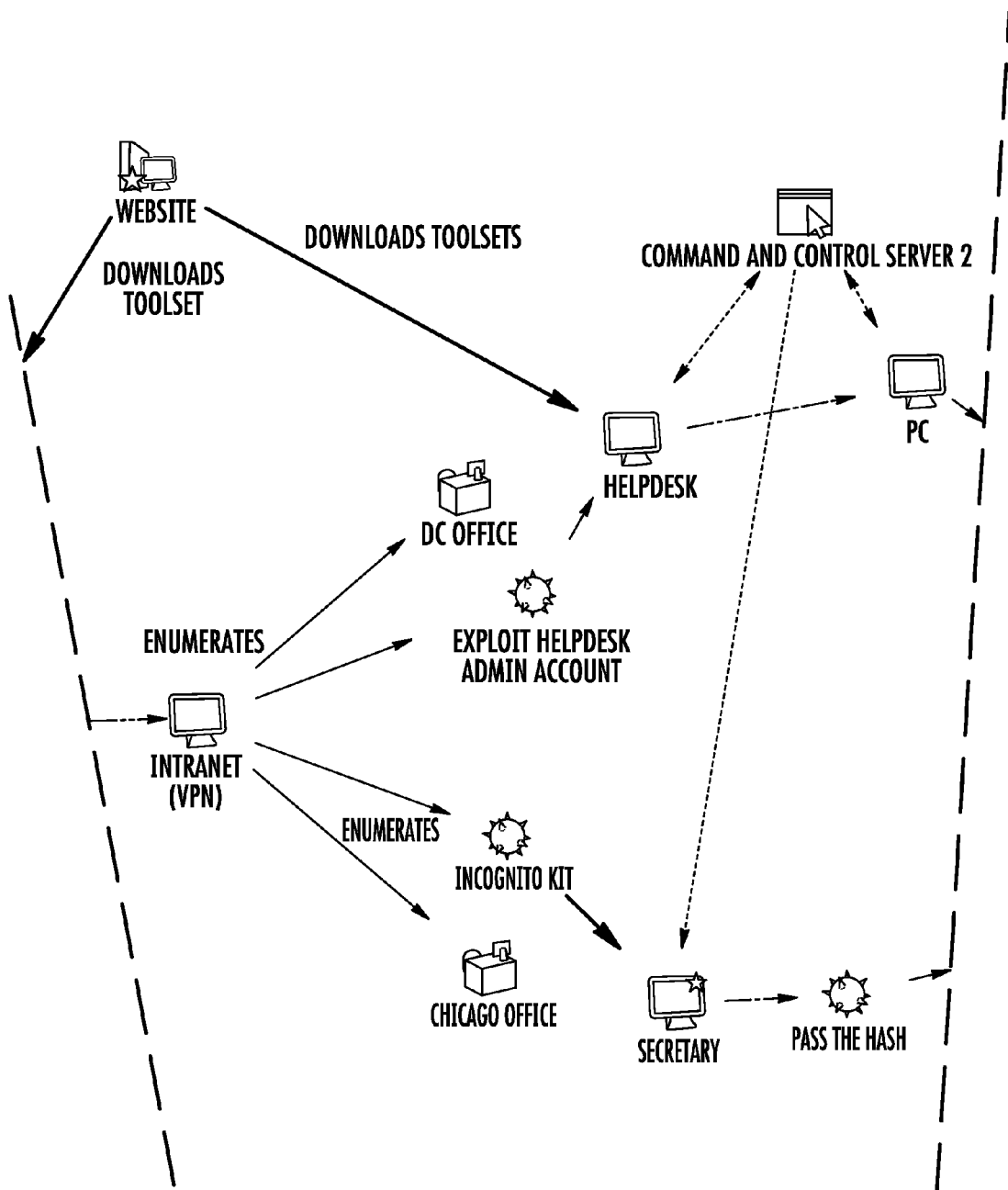
Figure 20C:
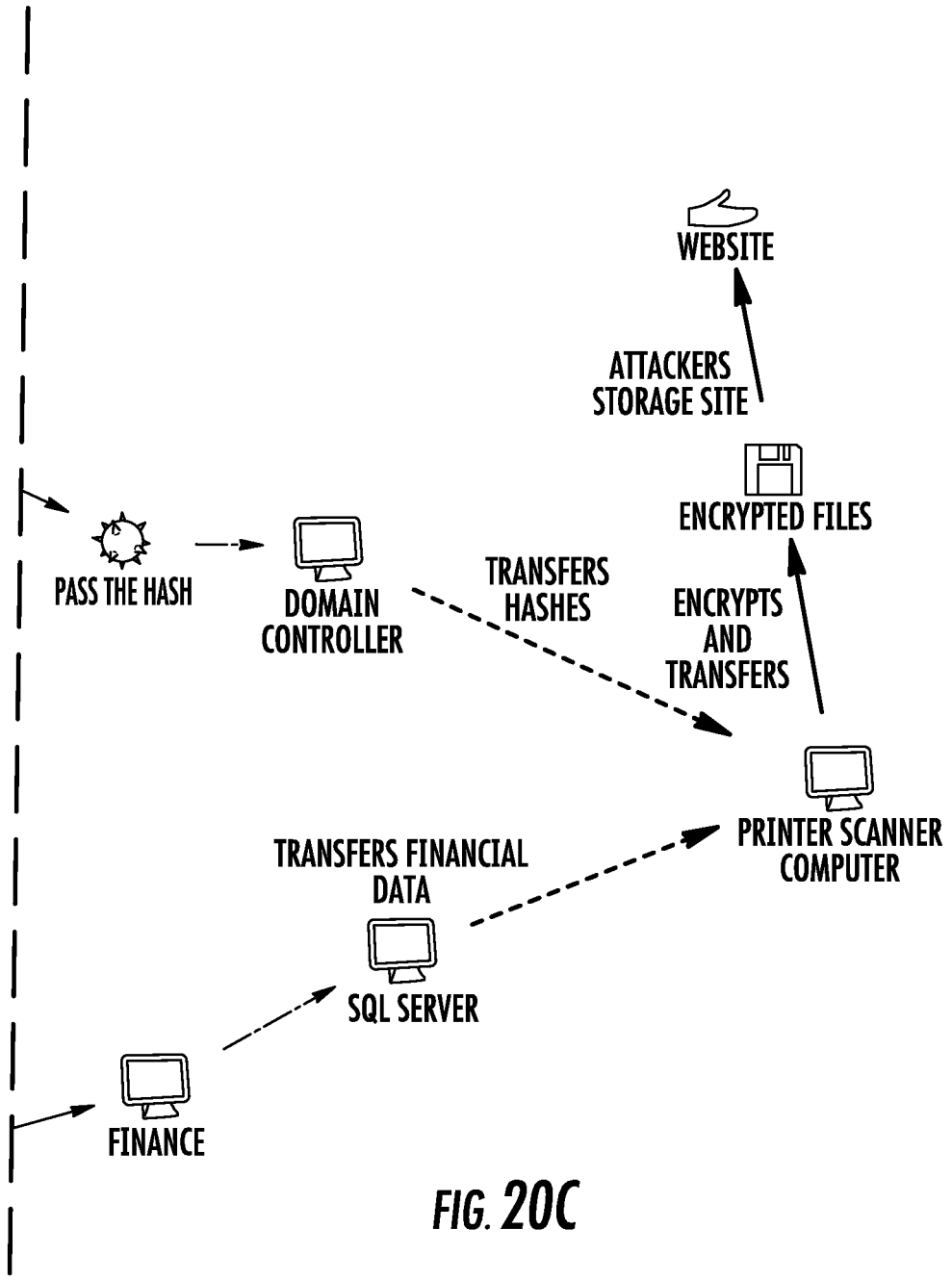

By way of further example, and as illustrated with reference to FIGS. 20A, 20B and 20C combined to illustrate a link analysis portal, wherein a portal procedure takes the active attacks that are discovered through incident response teams. Threat optimization and searches provide a graphical display that customers can query, by way of example. The portal is based on link analysis and actions created by adversaries and or malicious code on computers and inside the client infrastructure. With such, a network owner or user can learn exactly where in the network the Intruder has appeared and take corrective action.

Flowcharts and block diagrams herein described illustrate architecture, functionality, and operation of possible implementations of processors or systems, methods and computer program products according to various embodiments. Therefore, it will be understood by those of skill in the art that each block in the flowchart or block diagram may represent a module, segment, or portion of code, which comprises one or more executable computer program instructions for implementing the specified logical function or functions. Further, some implementations may include the functions in the blocks occurring out of the order herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of various embodiments may be embodied as a system, method or computer program product, and accordingly may take the form of an entirely hardware embodiment, an entirely software embodiment (including firmware, resident software, micro-code, and the like) or an embodiment combining software and hardware aspects that may all generally be referred to herein as a circuit, module or system. Furthermore, aspects of various embodiments may take the form of a computer program product embodied in one or more computer readable media having computer readable program code embodied thereon. It is understood that the computer implemented method herein described operates with readable media relating to non-transitory media, wherein the non-transitory computer-readable media comprise all computer-readable media, with the sole exception being a transitory, propagating signal.

Any combination of one or more computer readable media may be utilized. A computer readable medium may be a computer readable signal medium or a computer readable storage medium. A computer readable storage medium may be, by way of non-limiting example, an electronic, magnetic, optical, electromagnetic, infrared, or semiconductor system, apparatus, or device, or any suitable combination of the foregoing. More specific non-limiting examples of the computer readable storage medium may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination thereof. Computer program code for carrying out operations for aspects of various embodiments may be written in any combination of one or more programming languages, including an object oriented programming language such as Java, Smalltalk, C++ or the like and conventional procedural programming languages, such as the C programming language or similar programming languages. The program code may also be written in a specialized language. The program code may execute entirely on the user's computer, partly on the user's computer, as a stand-alone software package, partly on the user's computer and partly on a remote computer, or entirely on the remote computer or server. The remote computer may be connected to the user's computer through any type of network, including a local area network (LAN) or a wide area network (WAN), or the connection may be made to an external computer (by way of non-limiting example, through the Internet using an Internet Service Provider).

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described.

That which is claimed is:

1. A computer-implemented system for automated internet threat detection and mitigation, the system comprising:
    a centralized database;
    a customer database operable with the centralized database;
    a threat Intelligence subsystem for receiving intelligence data from a plurality of external intelligence sources;
    an analytics subsystem communicating with the threat intelligence subsystem for tracking accuracy and relevance of the intelligence data, wherein suspicious patterns are transmitted to the centralized database for use by automatic query security tools in a customer network environment;
    a data gathering subsystem for gathering public data from a plurality of website sources sufficient for providing context for the analytics subsystem;
    a portal subsystem comprising at least one of an analyst portal and a customer portal, wherein:
        the analyst portal allows analysts to query the customer database and incidents detected resulting from patterns from the threat intelligence segment, the analyst portal further tracks various metrics of analyst performance and provides feedback to the system; and
        the customer portal operable for allowing the customer to view the analyst performance metrics as well as customize threat intelligence feeds, local security tools, and descriptions of the customer environment and customer assets, and wherein the customer portal provides information feedback for the system; and
    a Honeytrap subsystem deployed within the customer network environment, wherein the Honeytrap subsystem monitors scams and cyber-attacks and analyzes suspicious activity, feeding resulting analysis data to the analytics subsystem, wherein the Honeytrap subsystem is operable for monitoring files used by adversaries on compromised computers so as to form a basis of an early alerting system, and wherein the Honeytrap subsystem is customized to particular locations, and automatically incorporating and quarantining infected computers.

2. The computer-implemented system according to claim 1, wherein the threat intelligence subsystem normalizes the intelligence data received from each of the plurality of external intelligence sources and stores resulting normalized intelligence data in the centralized database.

3. The computer-implemented system according to claim 1, wherein the public data includes at least one of natural language processing and broad economic, financial, and political data for use by the analytics subsystem for understanding and predicting at least one of hacktivism, state-backed hackers, and industrial espionage.

4. The computer-implemented system according to claim 1, wherein the analytics subsystem unifies the data sources received from the threat intelligence subsystem, data gathering subsystem, and the centralized database.

5. The computer-implemented system according to claim 4, wherein the analytics subsystem operates with machine-learning tools for finding and exploiting patterns within the gathered information.

6. The computer-implemented system according to claim 1, wherein the analyst portal directs incidents to an analyst for dealing with specific attacks and affected assets.

7. The computer-implemented system according to claim 1, wherein the threat Intelligence subsystem comprises a reader processor for ingesting the intelligence data from the plurality of external intelligence sources, the reader processor processing the data received from each source for providing normalized data in a preselected standard format, the reader processor operable with threat intelligence produced by predictive or investigative routines, thus allowing patterns produced by the analytics subsystem to be used automatically.

8. The computer-implemented system according to claim 7, wherein the threat intelligence subsystem comprises a gatekeeper processor operable for receiving the normalized data from the reader processor and assigning a believability factor based on past performance of each of the plurality of external intelligence sources providing information and a similarity of new patterns to data associated with past events.

9. The computer-implemented system according to claim 8, wherein the gatekeeper processor is operable for recognizing a prospective pattern that will likely produce false positive information, and wherein the prospective pattern is dropped, fed directly into the incident database, or referred to the analyst for a decision.

10. The computer-implemented system according to claim 8, further comprising a filter processor operable with the centralized database and the customer database for comparing the threat intelligence data associated with customer enterprise security devices.

11. The computer-implemented system according to claim 10, wherein the threat intelligence system comprises an investigator processor providing fill-in data associated with suspicious events received from the filter processor, wherein detailed incidents are passed from investigator processor through the filter processor to an incident database stored within at least one of the centralized database and the customer database, and wherein identified suspicious events are passed to the investigator processor from the filter processor for researching additional details.

12. The computer-implemented system according to claim 11, wherein the investigator processor is operable with the customer enterprise security devices for providing a more detailed view of at least one of an event, affected machines, user, and application, and queries external reputation databases, geo-location data, and other potential sources of information to learn more about the programs and external entities involved in an incident.

13. The computer-implemented system according to claim 12, wherein the investigator processor communicates with Internet databases to perform malicious domain lookups and compare registrations across domains alerted by threat intelligence, and wherein the investigator processor communicates with the analytics subsystem for obtaining information relevant to the incident, thus providing a detailed record of each incident that can be presented to the analyst, and thus saving the analyst time, speeding research and understanding of each incident.

14. A computer-implemented method for automated internet threat detection and mitigation, the method comprising:
providing an analytics subsystem for identifying suspicious patterns of behavior in a customer network environment;
providing a reader processor operable with the analytics subsystem for gathering threat intelligence data from a plurality of threat intelligence sources, including commercial and open-source feeds as well as suspicious patterns identified by the analytic subsystem or specified by an analysts through a portal connection;
normalizing the data by the reader processor and providing a common format;
providing an initial believability factor based only on past performance of the relevant source of the threat intelligence data;
providing a gatekeeper processor operable with the reader processor and the analytics subsystem, the gatekeeper reviewing the normalized intelligence data and comparing the data to past incidents and rules operable by the analytics subsystem for refining the believability factor and severity of each indicator, wherein if the believability factor is too low, the gatekeeper processor will either ask a human to check the data or discard the believability factor indicated as unusable and overly likely to generate false positives; and
deploying a Honeytrap subsystem within the customer network environment, the Honeytrap subsystem monitoring scams and cyber-attacks and analyzing suspicious activity, feeding resulting analysis data to the analytics subsystem, wherein the Honeytrap subsystem is operable for monitoring files used by adversaries on compromised computers so as to form a basis of an early alerting system, and wherein the Honeytrap subsystem is customized to particular locations, and automatically incorporating and quarantining infected computers.

15. The computer-implemented method according to claim 14, wherein a manager processor distributes the resulting normalized threat intelligence to the customer, and wherein tagged data will result in a higher believability factor or severity for specified targets and lower a believability factor and severity for non-tagged data.

16. The computer-implemented method according to claim 15, wherein a filter processor acquires indicators from the manager processor and sorts the indicators by severity and believability, wherein customer security tools are queried, and a centralized watch lists automatically generated and provided to relevant security tools, and wherein queries or watch lists generate a result, and wherein the result is transmitted to an investigator processor for obtaining information relevant to the incident.

* * * * *

UNITED STATES PATENT AND TRADEMARK OFFICE
CERTIFICATE OF CORRECTION

PATENT NO.        : 9,258,321 B2
APPLICATION NO.   : 13/973027
DATED             : February 9, 2016
INVENTOR(S)       : Amsler et al.

Page 1 of 1

It is certified that error appears in the above-identified patent and that said Letters Patent is hereby corrected as shown below:

Title page, (56) column 2, under "Other Publications, line 1, delete "Vulnerabiltiy" and insert --Vulnerability--, therefor Specification In column 4, line 16, delete "invention;." and insert --invention;--, therefor In column 9, line 46, delete "dataare" and insert --data are--, therefor In column 15, line 12, delete "programing" and insert --programming--, therefor Signed and Sealed this
Second Day of August, 2016

Michelle K. Lee
*Director of the United States Patent and Trademark Office*